April 5, 1960
W. BRAUN ET AL
2,931,635
ELECTRICALLY OPERATED STOVE CHANGING CONTROL
APPARATUS FOR BLAST FURNACES
Filed Sept. 9, 1957
12 Sheets-Sheet 1
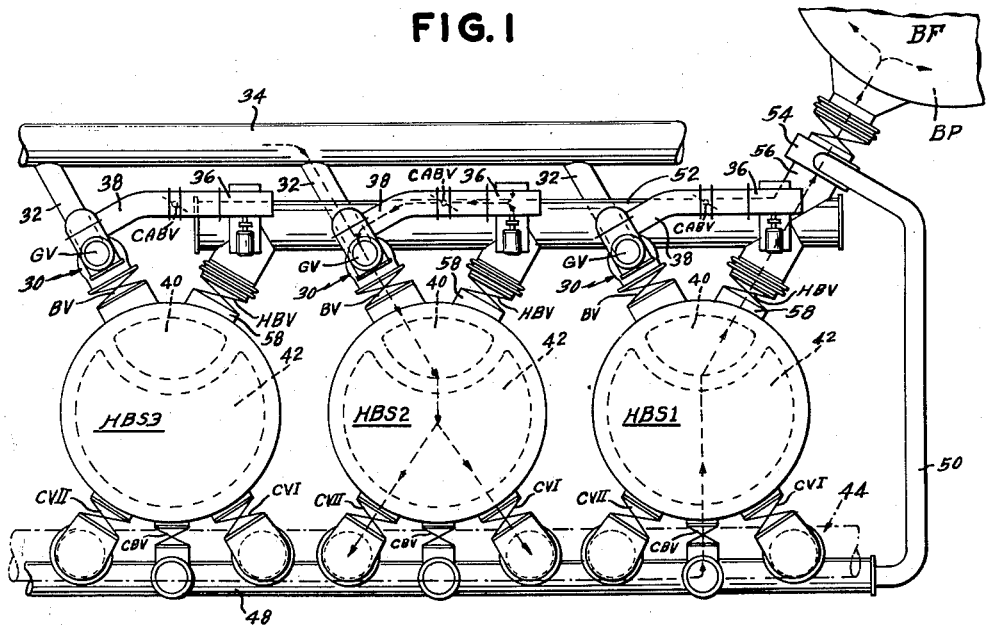
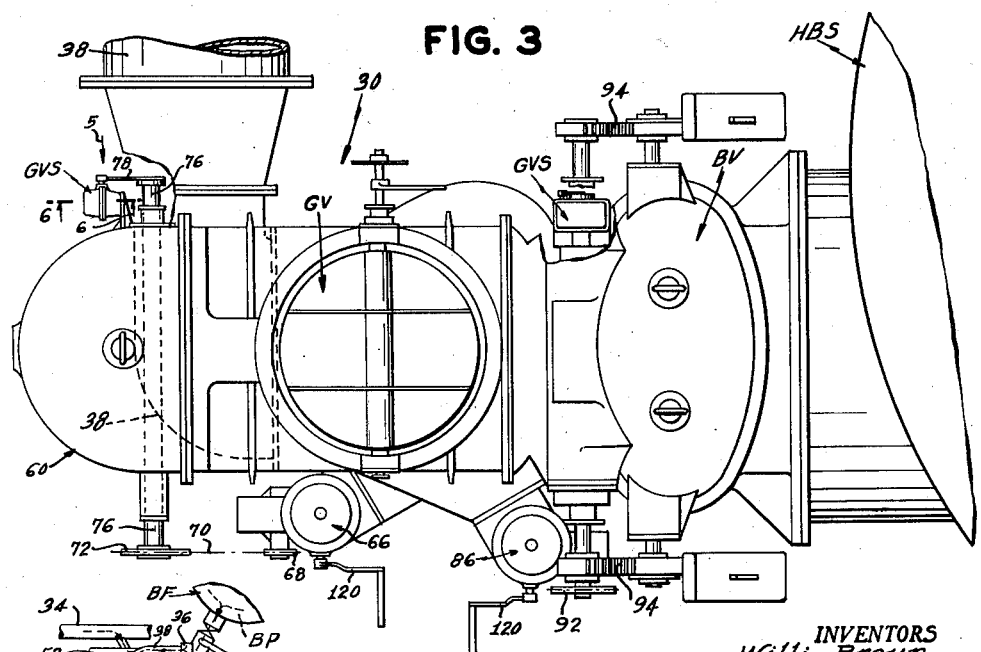
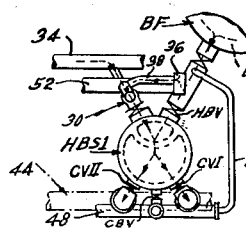
INVENTORS
Willi Braun
Hermann Jansen
BY Bernhard Scholl
Edwin Leinstuhn & Harry Cohen
ATTORNEYS

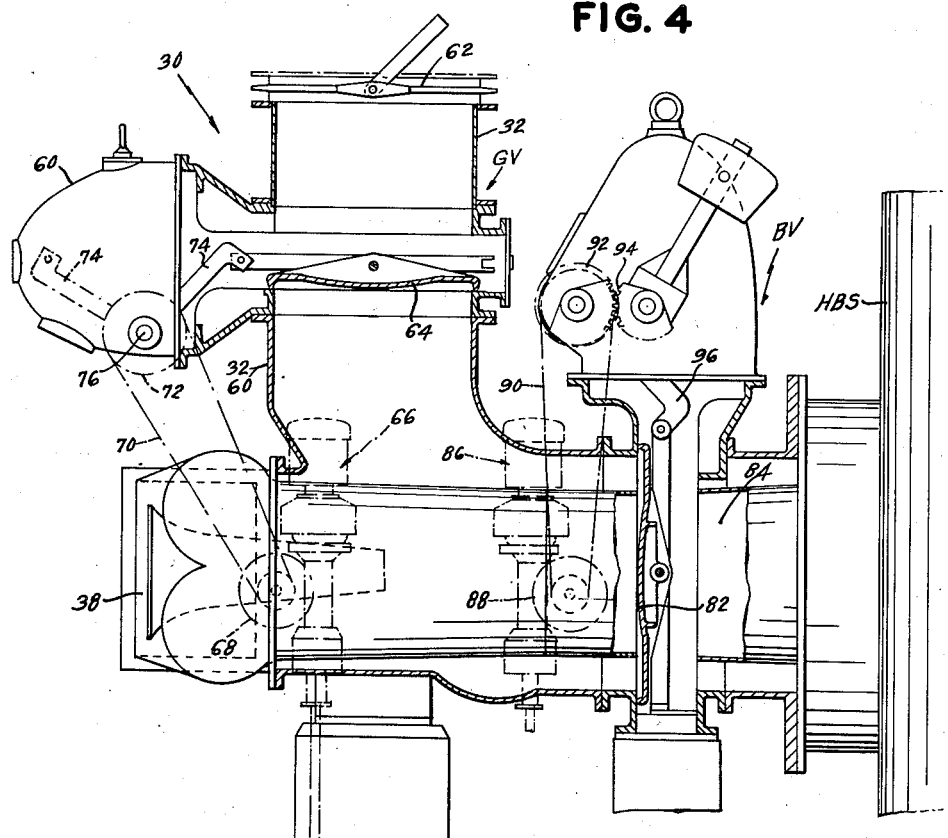

April 5, 1960

W. BRAUN ET AL 2,931,635

ELECTRICALLY OPERATED STOVE CHANGING CONTROL
APPARATUS FOR BLAST FURNACES

Filed Sept. 9, 1957

INVENTORS
Willi Braun
Hermann Jansen
Bernhard Scholl
BY

ATTORNEYS

FIG. 11  FIG. 12  FIG. 13
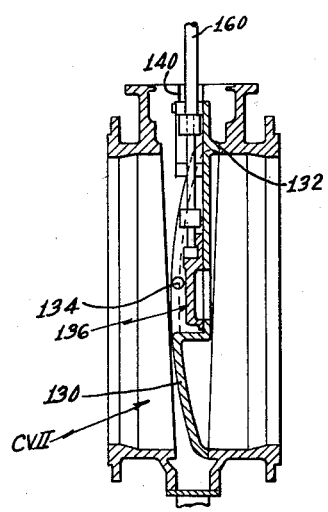
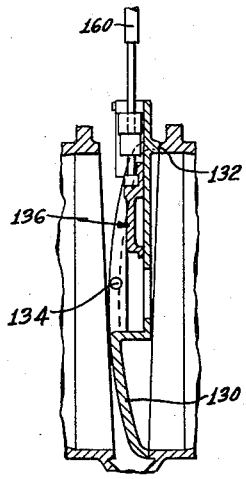
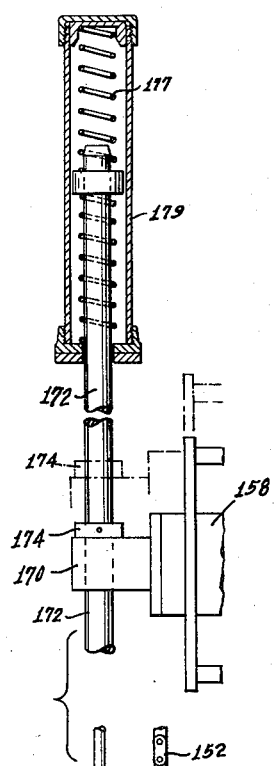
FIG. 14
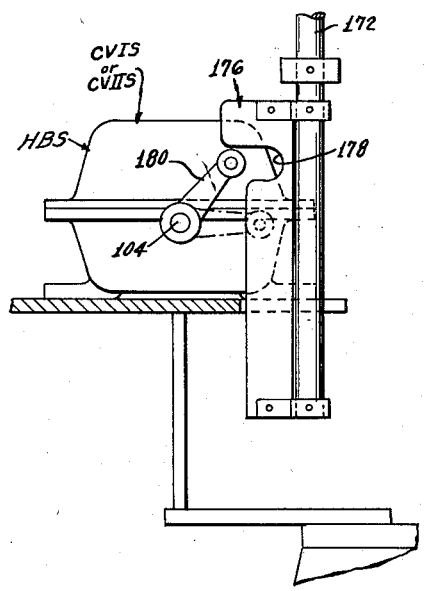
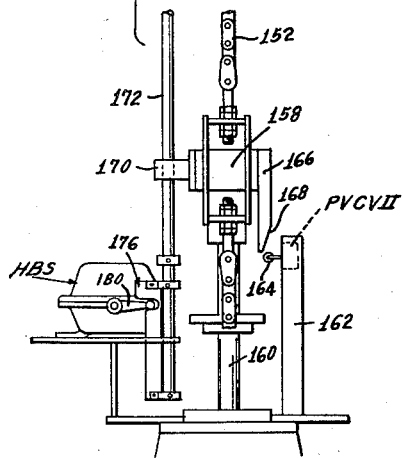
INVENTORS
Willi Braun
Hermann Jansen
Bernhard Scholl
BY Edwin Leinother & Harry Cohen
ATTORNEYS

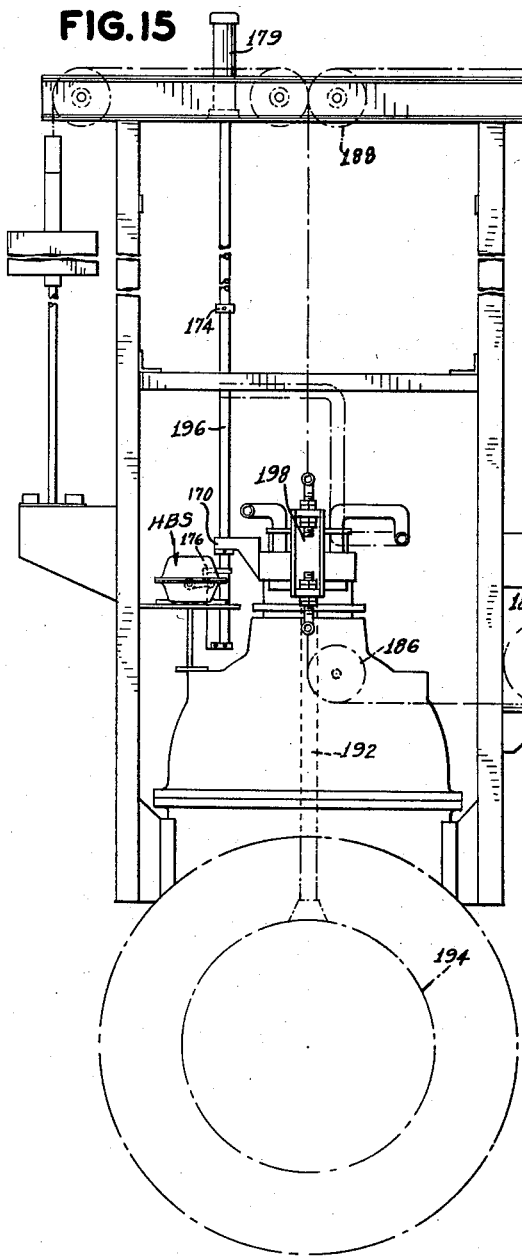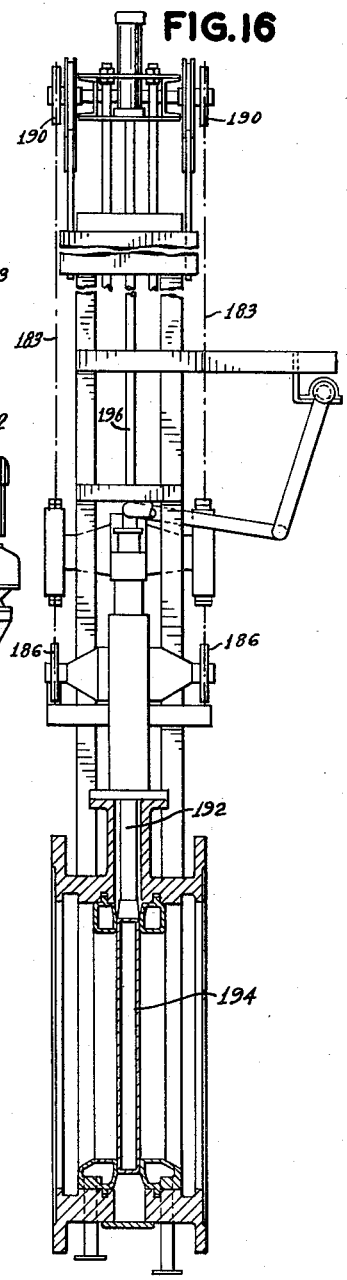

INVENTORS
Willi Braun
Hermann Jansen
Bernhard Scholl
BY
Edward Lewisohn & Harry Cohen
ATTORNEYS INVENTORS
Willi Braun
Hermann Jansen
Bernhard Schott
BY
ATTORNEYS United States Patent Office 2,931,635
Patented Apr. 5, 1960

2,931,635

ELECTRICALLY OPERATED STOVE CHANGING CONTROL APPARATUS FOR BLAST FURNACES

Willi Braün, Derichsweiler, Duren, Rhineland, and Hermann Jansen and Bernhard Scholl, Duren, Rhineland, Germany, assignors to Zimmerman & Jansen G.m.b.H., Duren, Rhineland, Germany, a corporation of Germany Application September 9, 1957, Serial No. 682,913

21 Claims. (Cl. 263—19)

The present invention relates to an electrically operated stove changing control for hot blast stoves.

It is an object of the present invention to provide a stove changing control apparatus which provides an extremely high degree of safety both to the operator thereof and to the plant in which the stoves are located.

Another object is to provide a stove changing control which greatly increases the efficiency of the hot blast stove operation.

Another object is to increase the control which the operator has over the stoves and to simplify the working operations of the operator in controlling the operation and changing of the stoves.

Another object is to provide a valve control system for blast furnace stoves wherein the operation of all valves is performed in an interlocked sequence which eliminates the necessity for any human intervention and therefore obviates the possibility of any human errors once the sequence of operations has been initiated.

Another object is to provide a control system wherein there is positive assurance that in a multi-stove operation, one stove is always "on blast," the arrangement being such that a stove which is "on gas" must be put into the "on blast" condition before the stove which is "on blast" can be returned to an "on gas" condition.

Pursuant to another object, each stove has a specially provided, independent switch for the "back draft" operation thereof so as to remove it from the same switch control mechanism which controls the other conditions of the stove, for example the "on gas" and "on blast" conditions, so as to provide for a much safer operation.

Another object is to provide, for each valve, a manual control which normally is in inoperative condition, the arrangement being such that when the manual control of any valve is rendered operative, the electrical circuit for the automatic control of all the valves in the system is interrupted.

Another object is to eliminate all manual operations heretofore involved in changing the operating conditions of blast furnace stoves and to make all of the valves subject to electrical control, so as to greatly decrease the time required for changing the operating conditions of the stoves.

Another object is to provide a single selecting switch for each stove, whereby the stove can be put into any one of the four following conditions, namely, "on gas," "on blast," "bottled from gas," and "bottled from blast."

A further object is the provision of a control panel having a position indicator for each valve, whereby the operator can immediately determine the position or condition of each valve.

A still further object is to provide for the elimination of the previously required program switch, the arrangement being such that the electrical energy required for operating each valve flows directly from one valve to the next valve without the necessity of passing through a program switch, whereby to greatly simplify the control arrangement.

The above and other objects, features and advantages of the present invention will be more fully understood from the following description considered in connection with the accompanying illustrative drawings.

In the drawings which illustrate the best modes presently contemplated of carrying out the invention:

Fig. 1 is a schematic layout of a blast furnace installation utilizing three hot blast stoves, with flow lines for two different conditions being shown in two of the stoves, respectively;

Fig. 2 is a fragmentary view similar to Figure 1 and indicates the flow through a stove for another operating condition thereof;

Fig. 3 is a plan view of the individual burner utilized in each of the stoves shown in Figure 1;

Fig. 4 is a view in elevation, and partly in section, of the burner shown in Figure 3;

Fig. 5 is a detail view, on a larger scale, taken in the direction of the arrow 5 in Figure 3;

Fig. 6 is a fragmentary sectional view, on an enlarged scale, taken on the line 6—6 of Figure 3;

Fig. 11 is a fragmentary sectional view taken on the line 11—11 of Figure 7;

Fig. 12 is a view similar to Figure 11 and shows another operating position of the valve;

Fig. 13 is a view in elevation, and partly in section, of mechanism associated with one of the chimney valves utilized in the apparatus of the present invention;

Fig. 14 is a detail view, on an enlarged scale, of a portion of Figure 13 showing the illustrated portion in another position thereof;

Fig. 15 is a front elevation of a hot blast valve utilized in the apparatus of the present invention;

Fig. 16 is a side elevation, partly in section, of the valve mechanism illustrated in Figure 15;

Figure 17:
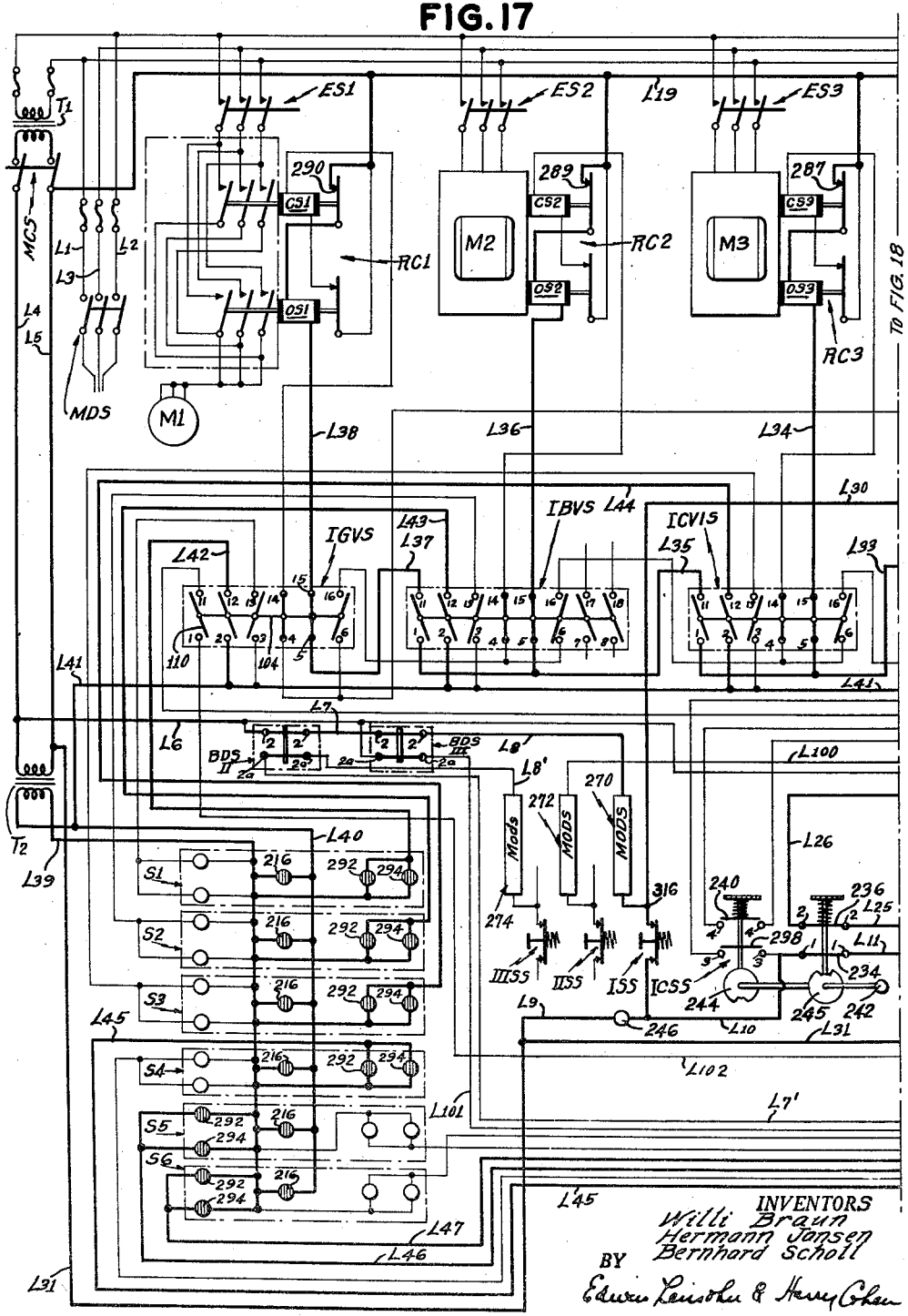
Figure 18:
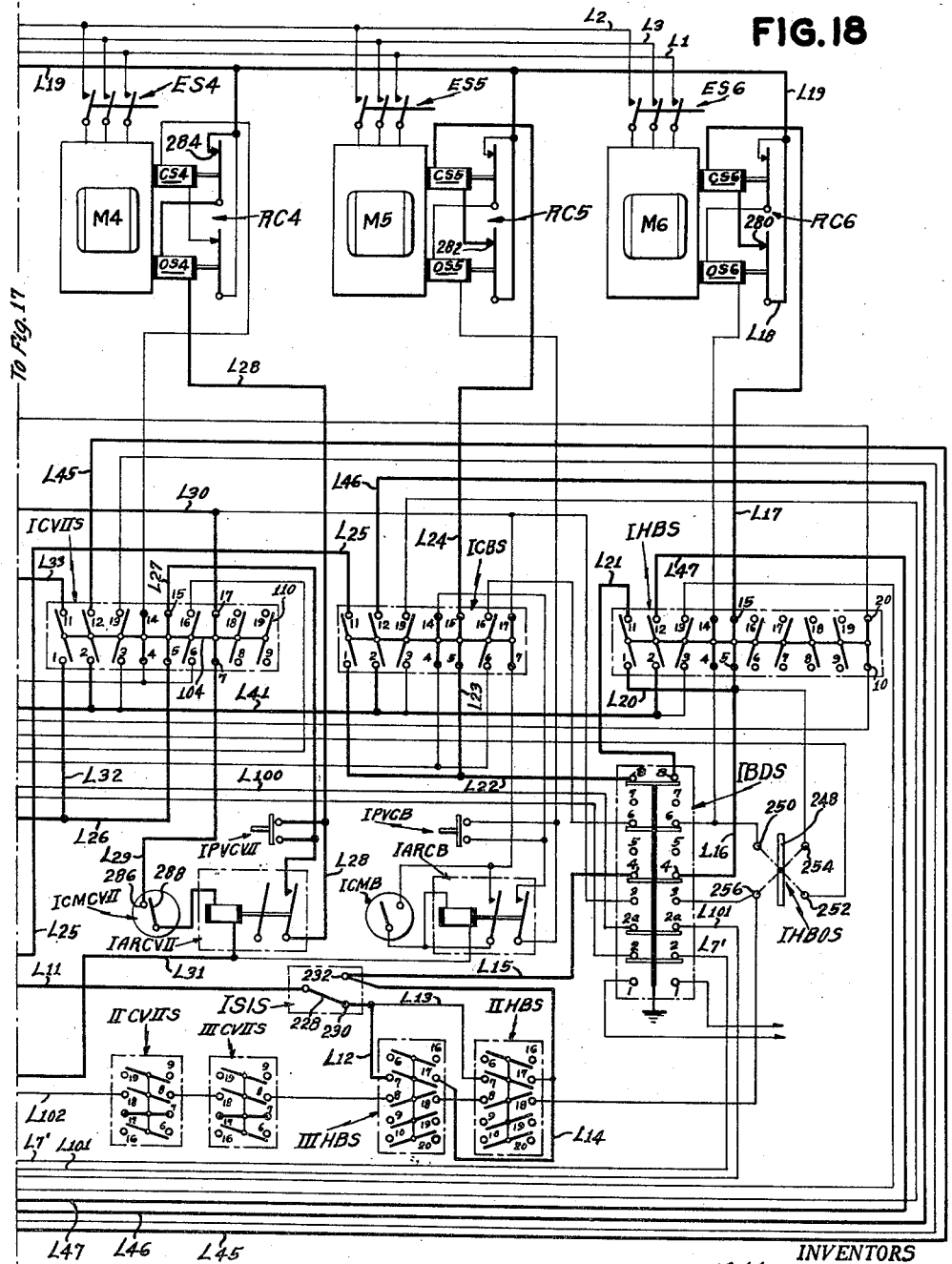
Figure 19:
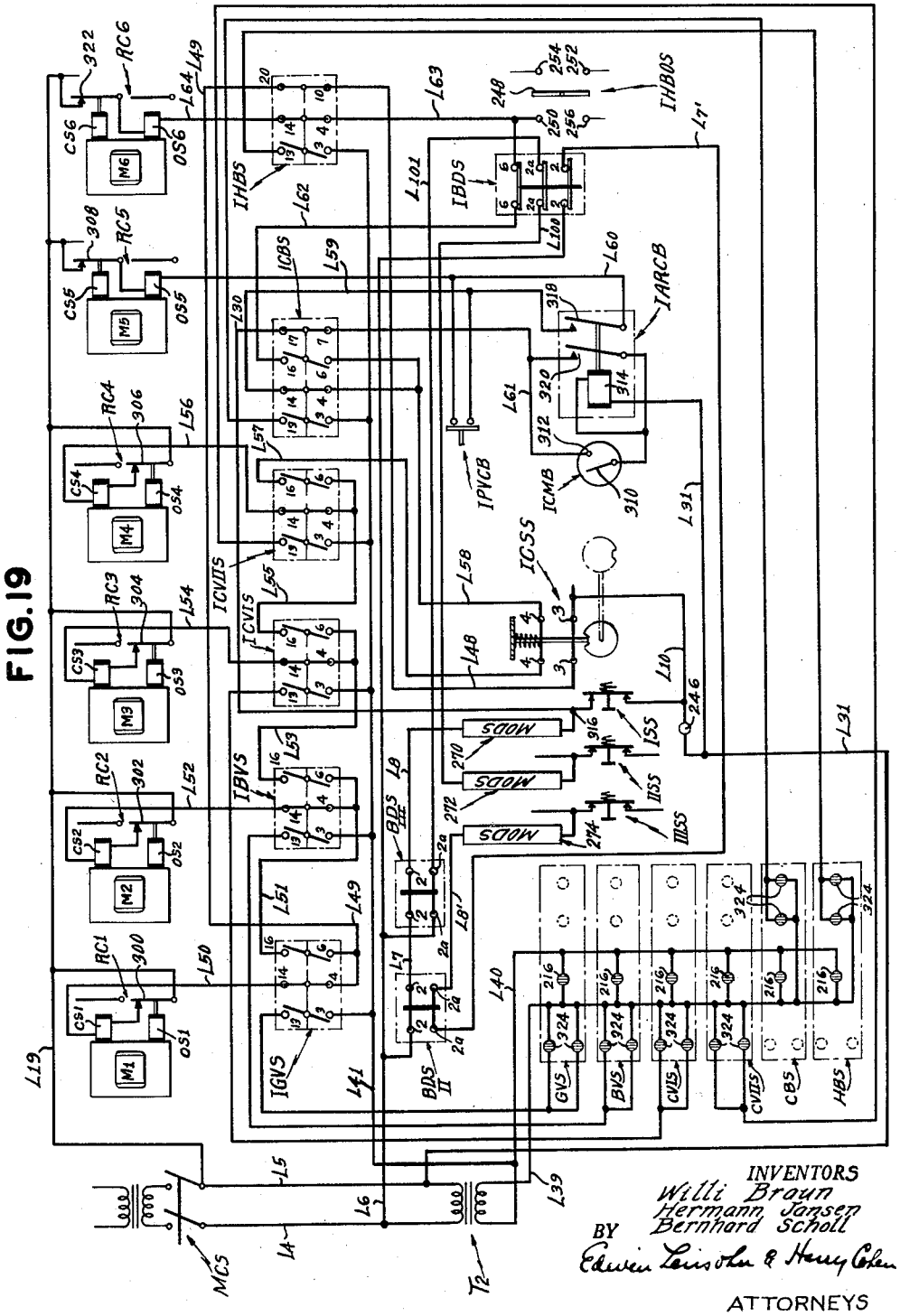
Figure 20:
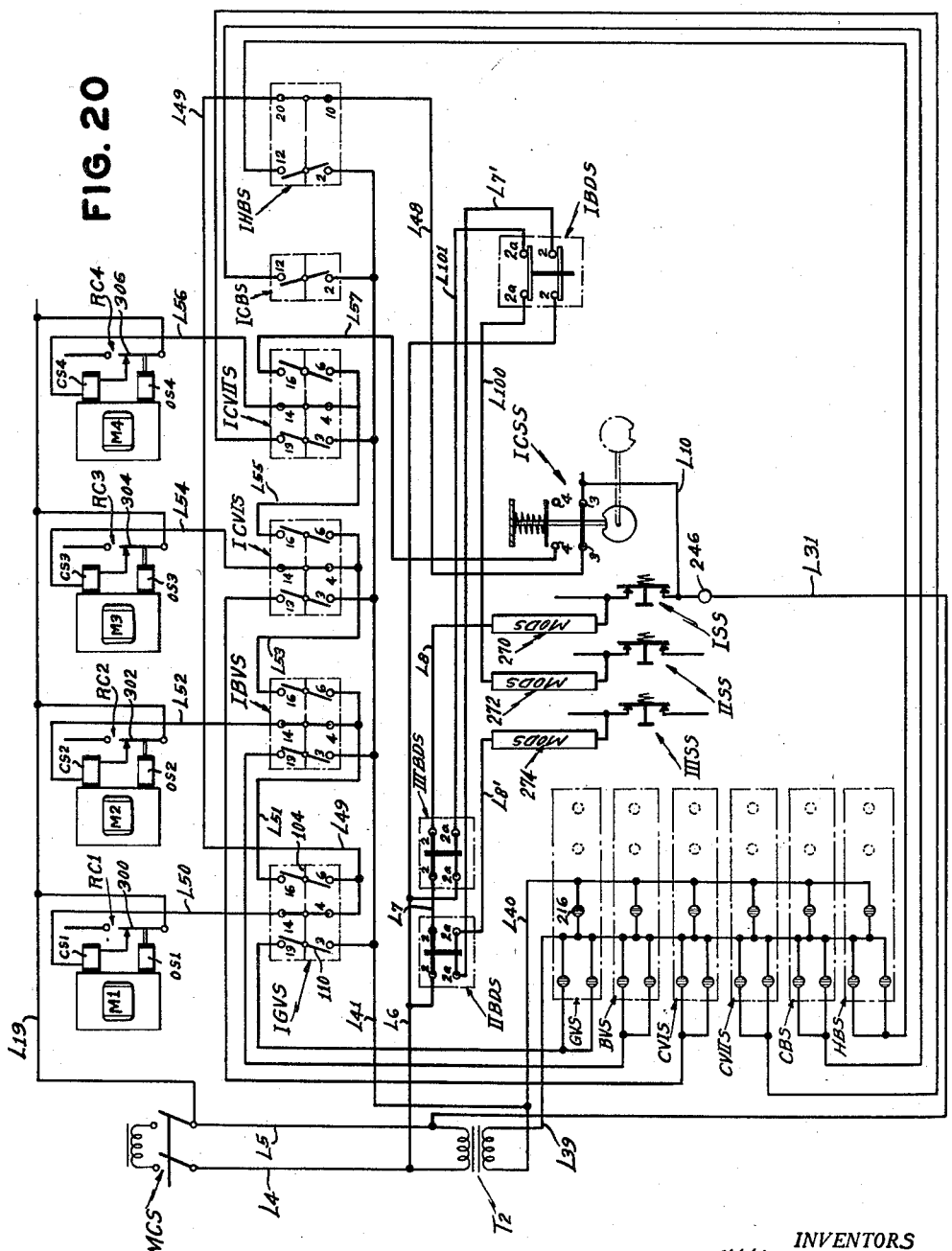
Figure 21:
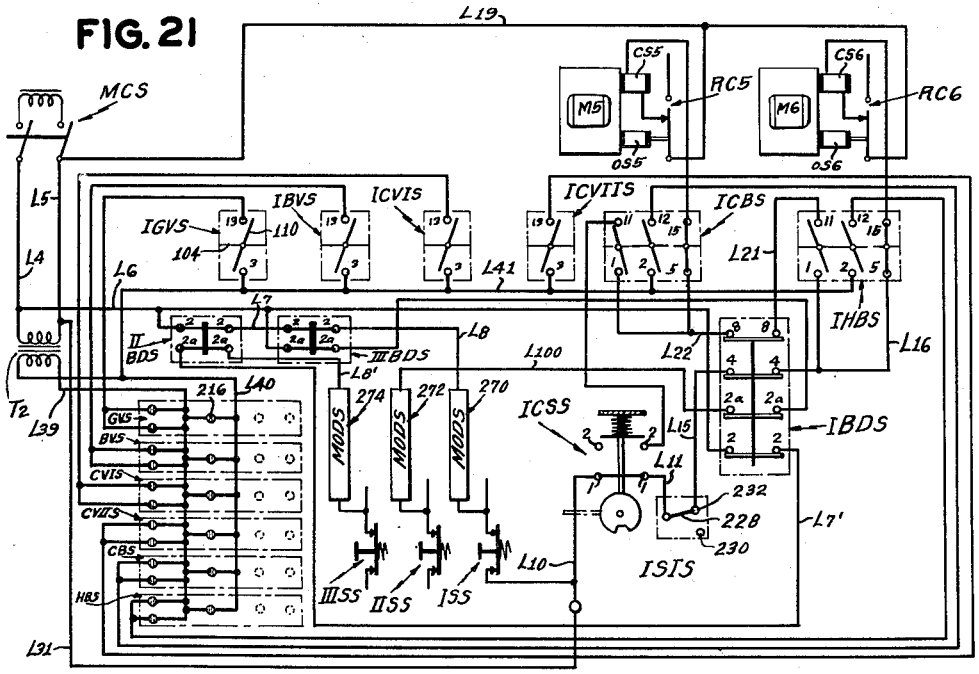
Figure 22:
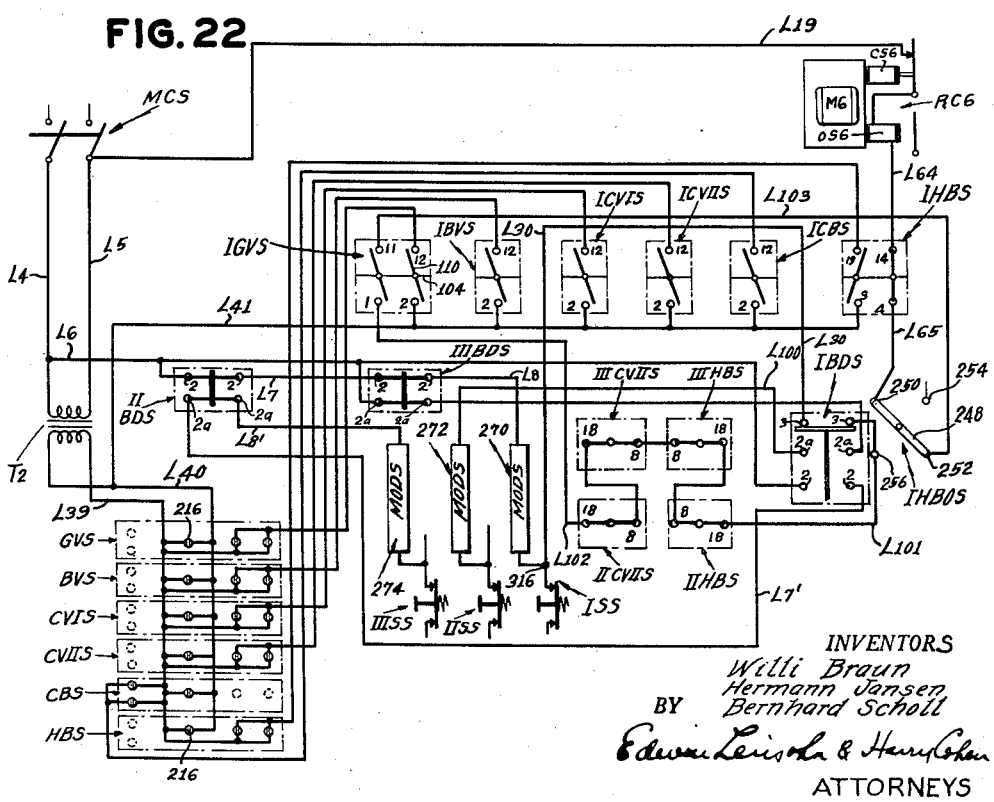
Figure 23A:
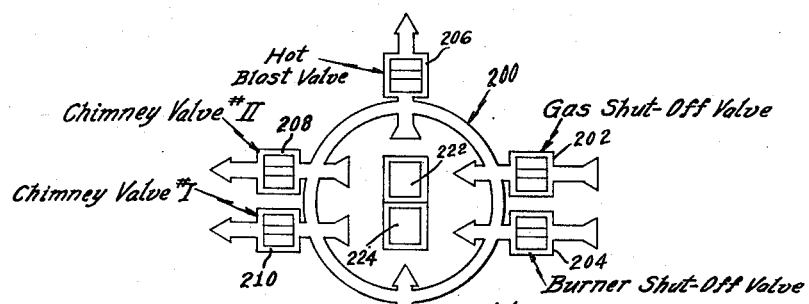
Figure 23B:
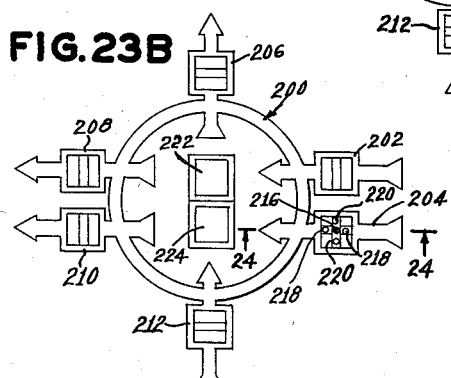
Figure 23C:
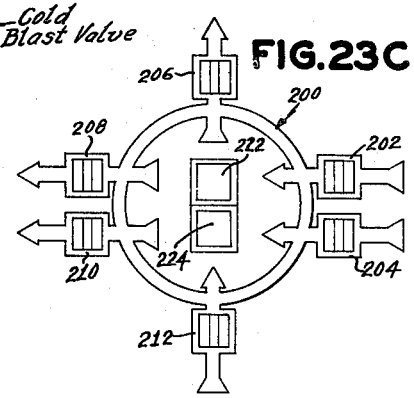
Figure 24:
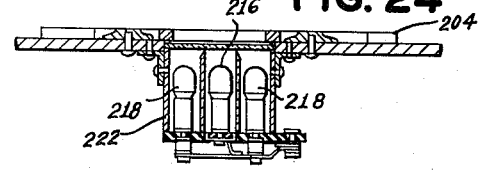
Figure 25:
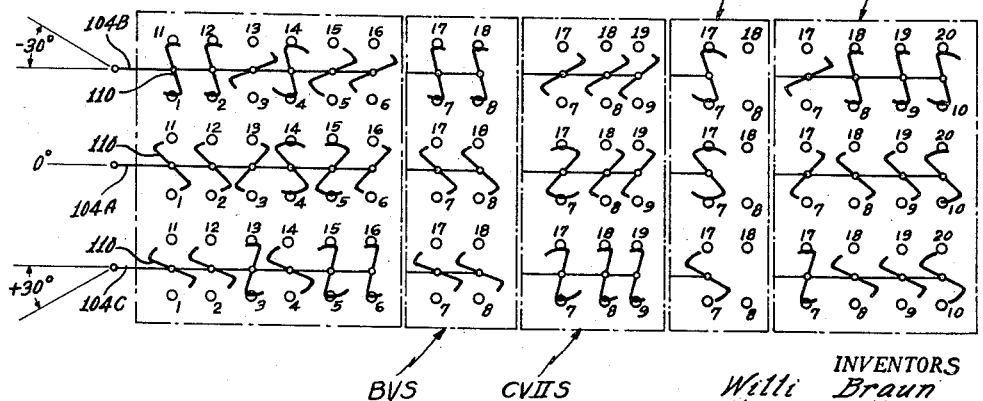

Figures 17 and 18, laid side-by-side, illustrate the complete wiring diagram for one of the hot blast stoves illustrated in Figure 1, with the valve controls of said stove set for placing the stove in "on gas" condition;

Figure 19 is a partial wiring diagram, based upon Figures 17 and 18 with the stove controls set for "on blast" condition;

Figure 20 is a view similar to Figure 19 with the stove controls set for "bottled from gas" condition;

Figure 21 is a view similar to Figures 19 and 20 with the stove controls set for "bottled from blast" condition;

Figure 22 is a view similar to Figures 19 through 21 with the stove controls set for "on back draft" condition;

Figs. 23A, 23B and 23C illustrate three different conditions of a valve-position indicating device on each of the hot blast stoves;

Fig. 24 is a sectional view, on an enlarged scale, taken on the line 24—24 of Figure 23B;

Fig. 25 is a schematic representation of the various positions of bridging contacts provided in limit switches associated with the various valves.

Referring now to the drawings in detail, Figure 1 shows a diagrammatic or schematic layout arrangement for a blast furnace BF served by the three hot blast stoves HBS1, HBS2 and HBS3. The hot blast stoves serve to provide a continuous hot blast required for the blast furnace operation. One of the hot blast stoves is at all times connected, by means of the hot blast main 52, with the blast furnace BF, while one or both of the other hot blast stoves are being heated up by the combustion of blast furnace gas. Each stove is provided with a burner, generally indicated by the reference numeral 30. Each burner, which includes a conventional gas shut off valve GV and a conventional burner shut-off valve BV, is connected, through a connecting pipe 32 to the gas main 34. Each stove is provided with a fan 36 which supplies the combustion air, required for combustion of the gas, through a conventional combustion air butterfly valve CABV, positioned in a combustion air conduit 38, which extends between the fan 36 and the burner 30. The gas-air mixture is consumed in the combustion chamber 40 of each stove and the hot flue gas heats up the checker work 42 in each stove. After flowing through the checker work 42, the cooled flue gas leaves the stove through conventional chimney valves CVI and CVII and, from the latter, flow through a flue 44 to the stack (not illustrated). A conventional cold blast valve CBV for each stove is connected with a cold blast main 48 which extends into a mixing main 50, the latter being connected into the hot blast main 52, as at 54. Each stove is coupled, by means of a hot blast valve HBV, to the hot blast main 52. The hot blast main has an extension 56 into the blast furnace, the cold blast air being coupled into this extension.

Assuming now that the hot blast stove HBS1 is set for "on blast" condition and that the hot blast stove HBS2 is set for "on gas" condition, the flow lines through each of said stoves are indicated in broken line in Fig. 1. For example, in the case of stove HBS1, which is "on blast," there is a flow from the cold blast main 48 through the cold blast valve CBVI on said stove, through the latter stove and through the associated hot blast valve HBVI into the hot blast main 52 and through the extended portion 56 of the latter into the blast furnace BF.

With the hot blast stove HBS2 set "on gas," there is a flow of gas from the gas main 34 through the pipe 32 and through the associated gas shut-off valve GVII and the associated burner shut-off valve BVII of the associated burner 30 into the stove. At the same time, there is a flow of combustion air fed by the associated fan 36 through the associated combustion air pipe 38 into the burner, for mixture with the gas, the gas-air mixture being burned in the associated combustion chamber 40 and flue gases passing from the associated checker work 42 into the stack through the associated chimney valves CVI and CVII.

With the stove HBS1 set for "on blast" condition, the following valves thereof are closed: The gas shut-off valve GV, the burner shut-off valve BV, the chimney valve CVI and the other chimney valve CVII. However, both the cold blast valve CBV and the hot blast valve HBV are opened and permit the total blast coming from the cold blast main 48 to be heated, as it flows through the checker work 42 of the hot blast stove HBS1, and to leave said stove as a hot blast after passing through the combustion chamber 40 thereof and out through the hot blast exit 58 from the stove through the hot blast valve HBV.

The settings of the various valves on the second stove HBS2, which is set for "on gas," is exactly opposite to the settings of valves on stove HBS1, which is set for "on blast." In other words, on the second stove, the cold blast valve CBV and the hot blast valve HBV are closed, while the gas shut-off valve GV, the burner shut-off valve BV, and the chimney valves CVI and CVII are open so as to provide an unimpeded flow into the stove of the gas and combustion air as well as to provide an unimpeded flow of the flue gas from the stove.

It is assumed that with stove HBS1 "on blast" and stove HBS2 "on gas," the third stove HBS3 is kept in reserve, and, this being the case, all its valves are closed. In cases of blast furnaces having a larger capacity, it is sometimes necessary to set two hot blast stoves "on gas" since one burner 30 does not have the capacity to consume the necessary gas volume in a fixed period. In such a case, the adjustments described in the case of hot blast stove HBS2 would also be made in the case of hot blast stove HBS3 so that both of the latter would be "on gas" while the first stove is "on blast."

If, after a certain length of time, the checker work 42 of stove HBS1, which is set "on blast," has cooled down to the extent that the required hot blast temperature is no longer maintained, then the second stove HBS2, which has been kept "on gas" and which is now sufficiently heated up, is switched to "on blast" condition. In order to maintain a continuous hot blast flow for the blast furnace BF, it is absolutely necessary that the stove HBS which is "on gas" must first be switched to "on blast" before the stove HBS which is set "on blast" is switched over to "on gas." In other words, with stove HBS1 "on blast" and stove HBS2 "on gas," when it is desired to switch the hot blast to stove HBS2 instead of stove HBS1, stove HBS2 must first be set "on blast" before HBS1 is switched back to "on gas." Consequently, during the stove changing operation from stove HBS1 "on blast" to stove HBS2 "on blast," the valves of stove HBS2 are operated in the following sequence: its gas shut-off valve GV is closed, its burner shut-off valve BV is closed, its chimney valve CVI is closed, its chimney valve CVII is closed, its cold blast valve CBV is opened and its hot blast valve HBV is opened. With the opening of the hot blast valve HBV of stove HBS2, the switching operation from "on gas" to "on blast" for the stove HBS2 is terminated and thereafter the valves on the stove HBS1 are operated or switched in the following sequence: its hot blast valve HBV is closed, its cold blast valve CBV is closed, its chimney valve CVII is opened, its chimney valve CVI is opened, its burner shut-off valve BV is opened and its gas shut-off valve GV is opened. With the opening of its gas shut-off valve, the change over operation from "on blast" to "on gas" for stove HBS1 is terminated.

In addition to the above described stove changing operations from "on gas" to "on blast" and vice-versa, there are also two pressure equalization operations which are included in the stove changing operation and which take into account different pressures inside the hot blast stoves. The first of these operations comprehends the gradual filling of the stove with cold blast pressure during the change-over of the stove from "on gas" to "on blast." In this connection, after its gas shut-off valve GV, its burner shut-off valve BV, and its chimney valves CVI and CVII are first closed, the entire cold blast valve CBV of said stove is not immediately open, but instead, a small pilot valve which is located in the main valve plate thereof, as hereinafter described in detail, and which permits the stove to be gradually filled with cold blast pressure is opened. The creations of fissures by sudden different pressures in the shell lining of the hot blast stove is thereby prevented, as is an unfavorable effect on the blast furnace operation which is caused by an extreme pressure drop in the cold blast main. As soon as pressure equalization between the hot blast stove, which is going "on blast," and the cold blast main is created by the pilot valve in the cold blast valve CBV, the main plate in the cold blast valve is opened and the entire diameter of the valve is free for admission of the cold blast.

The second pressure equalization operation occurs in switching a stove from "on blast" to "on gas." After the hot blast valve HBV and the cold blast valve CBV of said stove are closed, full cold blast pressure still prevails in said stove. This is a pressure which, in relation to atmospheric pressure, can show a difference up to 3.5 atmospheres of absolute or excess pressure of 35 pounds per square inch. Since it would be difficult to operate the main plates of the chimney valves CVI and CVII of said stove against this cold blast pressure which presses against the main plate and, since the cold blast volume suddenly flowing into the flue with substantially higher pressure would have a very unfavorable effect on the other hot blast stoves connected to the same flue and which are "on gas," a small pressure release plate in chimney valve CVII, as hereinafter described in detail, is first opened to allow the cold blast to flow gradually out of the hot blast stove through the flue to the stack. Only when pressure equalization is achieved between the hot blast stove, which is switched from "on blast" to "on gas," and the flue the main plate of the chimney valve CVII is opened, and thereafter the valve plate of the chimney valve CVI, which is not provided with a relief plate, is opened. Thereafter the burner shut-off valve BV of the stove going from "on blast" to "on gas" and the gas shut-off valve GV of said stove are opened and the change-over or switch-over procedure from "on blast" to "on gas" is terminated.

In connection with the foregoing description, it will be understood that the gas butterfly valve 62 in each gas connecting pipe 32 controls the volume of the gas and combustion air which enter the stove. These control valves make it possible, by means of gas volume control, to predetermine the number of calories to be stored in the checker work of each hot blast stove and, by controlling the combustion air volume, to provide a gas-air ratio necessary for good combustion. Since the hot blast flowing from the hot blast stove HBS, which is set "on blast," has a gradually decreasing temperature during the blast period, it is necessary, if the hot blast temperature in the bustle pipe BP of the blast furnace BF is to be kept constant, to mix cold blast with the hot blast flowing from the hot blast stove before reaching the bustle pipe of the blast furnace.

For instance: Immediately after a stove is put "on blast," the hot blast temperature at the hot blast exit 58 of said stove, in the present embodiment of the invention, is substantially 1050 degrees centigrade and falls during the blast period about 130 degrees centigrade to 920 degrees centigrade. If the required controlled hot blast temperature in the bustle pipe of the blast furnace BF is 900 degrees centigrade, then a greater cold blast volume must be mixed with the hot blast at the beginning of the blast period so that the temperature falls to the controlled temperature of 900 degrees centigrade. The cold blast volume to be mixed gradually drops, during the blast period, in conformity with the falling temperature of the hot blast and, at the end of the blast period, is almost equal to zero.

The supply of cold blast to the hot blast main, before the entry of the hot blast into the blast furnace, is effected through the previously mentioned direct mixer main 50 between the cold blast main 48 and the hot blast main 52. The cold blast volume is controlled by a conventional mixer blast butterfly valve (not illustrated) built into the mixing main 50.

The present invention is directed essentially to the automatic control of the various valves of each stove for effecting the different operating conditions thereof. The mechanical details of the stoves and their associated valves are in the main conventional and are illustrated and described herein only to the extent necessary for an understanding of the various valve control operations.

Referring now to Figs. 3 through 6 in detail, there is illustrated a burner 30 which is utilized in connection with each of the hot blast stoves HBS. Each burner is provided with a housing 60, which is in communication both with the combustion air conduit 38 and with the connecting pipe 32 from the gas main 34. Pipe 32 includes a gas shut-off valve GV and a gas regulating butterfly valve 62 for controlling the volume of gas flow. The valve member 64 of the gas shut-off valve GV extends into the gas connecting conduit 32 and, in the position thereof illustrated in Fig. 4, shuts off the supply of gas. The valve plate 64 is operated by means of an electrical drive unit 66 which drives a sprocket wheel 68 interconnected by a sprocket chain 70 to a driven sprocket wheel 72 which operates a link 74 between the full and broken line positions thereof (shown in Fig. 4) for operating the valve plate 64 to open and close the passage of gas through the conduit 32. The link 74 is mounted on a shaft 76 keyed to the driven wheel 72 and said shaft also mounts a lever 78 for operating a conventional limit switch GVS.

The burner shut-off valve BV is provided with a valve plate 82 which, in the position thereof illustrated in Fig. 4 closes the pipe 32 at the entrance or inlet 84 to the hot blast stove. The valve BV is operated by an electric drive unit 86 through a drive sprocket wheel 88, a sprocket chain 90, a driven sprocket wheel 92 and the gearing 94 for operating the linkage 96 for raising and lowering the valve plate 82. It will be noted that the burner shut-off valve BV acts as a common valve for both gas and combustion air. The drive unit 86 also operates a lever limit switch BVS for the valve BV. The lever limit switch BVS is similar in construction to the lever limit switch GVS, and it will be understood that each drive unit is switched off by its associated lever limit switch which is directly coupled, in each case, to the main drive shaft of the associated valve.

As best seen in Figs. 5 and 6, each lever limit switch comprises a housing 100 in which various stationary contacts, generally indicated by the reference C' are located. A rotary drum shaft 104 is mounted in the housing and mounts a plurality of cam elements or discs 106. The shaft 104 mounts an operating lever 102 which constitutes a crank arm which is driven by the main drive shaft of the associated valve through linkage 108. A cam follower 110 is provided for each stationary contact C', the cam follower being provided with a movable contact element C'' for engagement with a companion stationary contact element C'. Depending upon the design of the particular cam 106, each contact C'' engages a companion stationary contact C' or disengages the companion stationary contact in response to the design of the cam. For example, as shown in Figure 6, the left hand contacts C' and C'' are engaged with the follower riding on the cam fall portion 116 and the right hand contacts C' and C'' are engaged with the associated follower 110 riding on the cam rise portion 118. The number of companion contact sets depends upon the particular valve with which the lever limit switch is associated as will hereinafter be described in detail, Fig. 25 being a schematic illustration of the contact arrangements in the various lever limit switches.

In addition to the electrical drive units 66 and 86, the gas shut-off valve and the burner shut-off valve can also be operated manually by means of a manual drive 120 which is normally disconnected. If the valves are, for any reason, to be operated by hand, it is first necessary to insert a coupling element 122 (Fig. 10) in the drive so as to provide a connection between the hand drive 120 and the gear train of the valve. Simultaneously with the insertion of such a coupling element 122, the control current for all of the valves associated with the particular hot blast stove is interrupted so as to prevent any of the electrical drive units for the valves of said stove from being inadvertently started or energized while one of the valves thereof is being manually operated and thereby obviating the possibility of injury to an attendant or operator.

Figure 10:
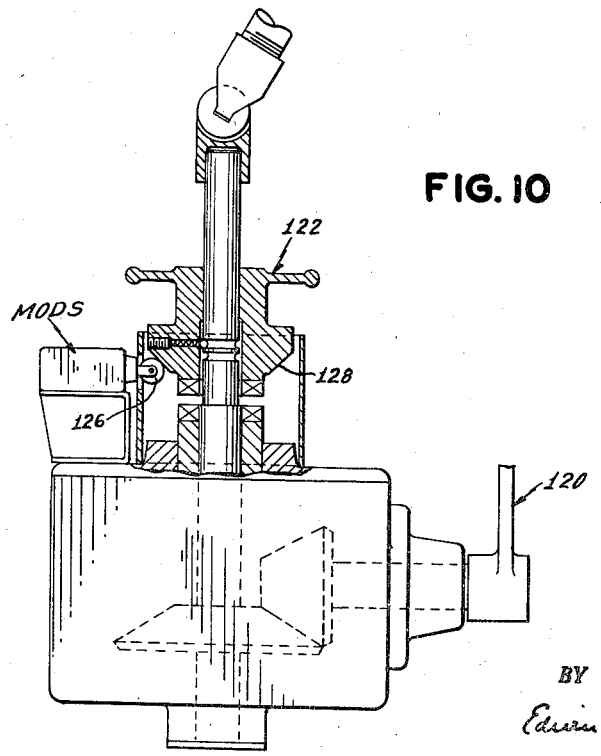
Fig. 10 is an enlarged view partly in section, of the portion of Figure 7 indicated by the arrow 10.

As best seen in Figure 10 which relates to the manual drive 120 for a chimney valve CVII, but which drive is the same for all of the electrically operated valves of the various stoves, provision is made in connection with each of the electrically operated valves for a manual operating disconnect switch MODS. Each switch MODS has a projecting operating element provided with a roller 126 which is disposed in the path of movement of the conical surface 128 of the coupling element 122. Therefore, it will be readily apparent that when the coupling element 122 is connected in position as shown in Figure 10, the conical surface 128 thereof forces the roller 126 inwardly of the switch MODS so as to open or disengage the contacts of the switch and therefore interrupt the current through all of the operating drives for the various valves, as hereinafter described in detail.

Referring now to Figures 7 through 14 in detail, there is illustrated the chimney valve construction and the associated mechanism. As previously indicated, of the two chimney valves CVI and CVII associated with each hot blast stove, the chimney valve CVII is provided with a valve relief plate and a chimney valve CVI is not provided with a relief plate. In all other features of construction, both valves are exactly alike. The following description, while it specifically pertains to the chimney valve CVII, also applies to the chimney valve CVI, which as stated, is the same except that it lacks the relief plate. The chimney valves are of the slide type, provision being made for the main valve plate 130 which seals on only one side thereof. As best seen in Figs. 11 and 12, the main valve plate 130 is disposed between the hot blast stove and the flue 48 so that the blast pressure in the hot blast stove presses the valve plate on the sealing surface 132 at the flue. In addition, in the closed condition of the main valve plate 130, wedges 131 serve to press the main plate 130 against the underlying sealing surface 132.

As previously indicated, in changing a hot blast stove from "on blast" to "on gas," the chimney valve CVII, which is provided with the attached pressure relief plate or pilot valve 136 is the valve which first opens. The pressure relief plate 136 consists of a small relief plate which is mounted on the main valve plate 130 and by means of the lateral wedges 134 is pressed into closed position on its sealing surface. During the opening movement thereof, and in the opened position thereof, the relief plate 136 is mounted in and guided by guides 138 secured on the main valve plate. The main valve plate 130 rides in a guideway 140 provided in the valve body. When the associated hot blast stove is changed from "on blast" to "on gas," the hot blast valve HBV and the cold blast valve CBV having first been closed, the electrical drive unit 142 for the chimney valve CVII is energized and opens the relief plate 136. In this connection, it will be understood that the drive unit 142 is similar to previously describe electrical drive units. After the relief plate 136 reaches its upper end position, having moved from the closed position thereof illustrated in Fig. 11 to its upper end position illustrated in Fig. 12, the current to the drive unit 142 is interrupted, as hereinafter explained in detail.

Figure 8:
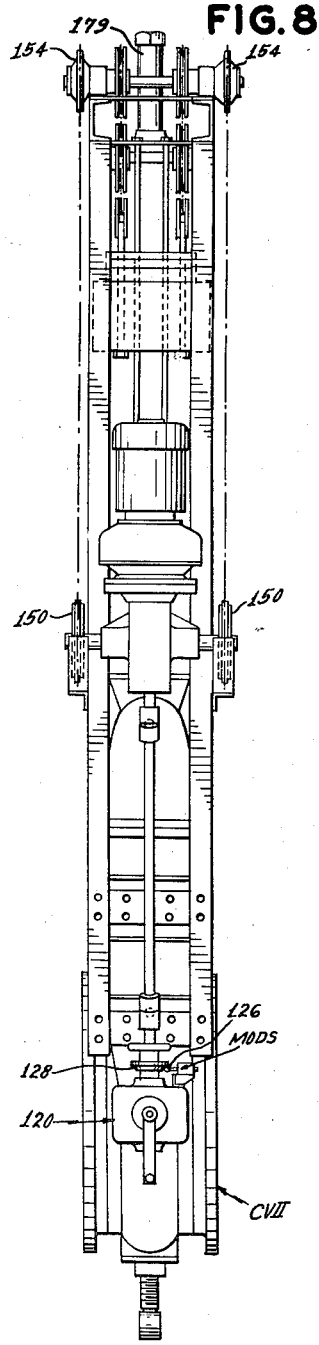
Fig. 8 is an elevational view taken in the direction of the arrow 8 of Figure 7.
Figure 7:
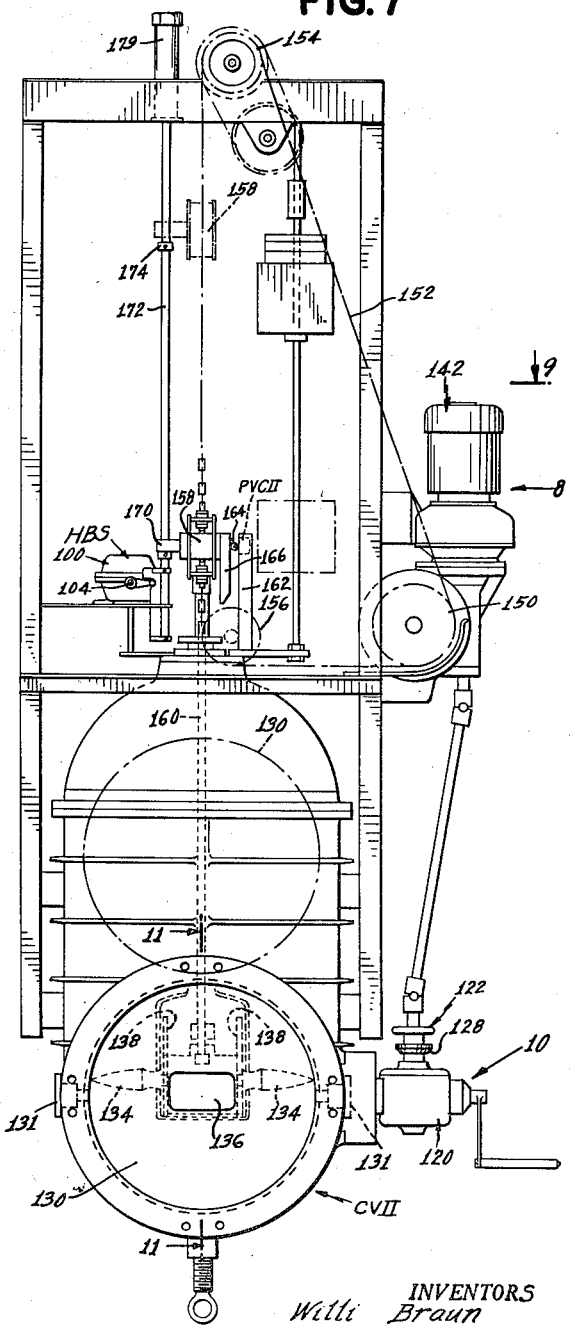
Fig. 7 is a view, in elevation, of a chimney valve utilized in the apparatus of the present invention; the valve being shown in its closed condition.
Figure 9:
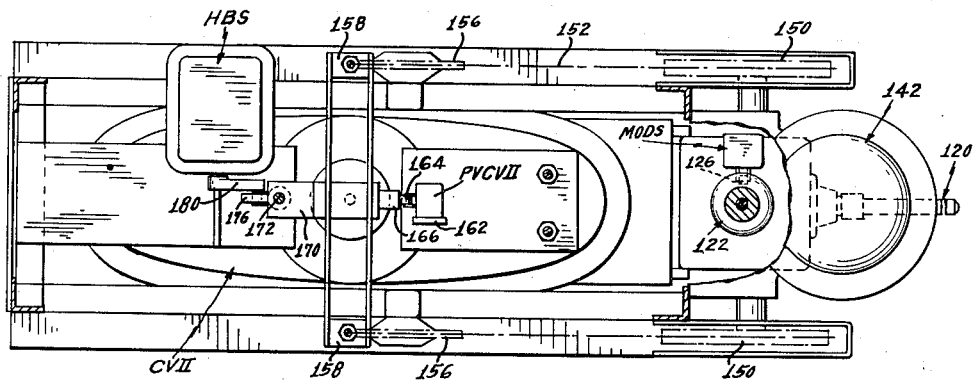
Fig. 9 is a sectional view taken on the line 9—9 of Figure 7.

The drive unit 142 operates a pair of drive rollers 150—150 on each of which there is threaded a link chain 152 which, in addition to being threaded on the sprocket wheel 150, is also threaded on a pair of sprocket wheels 154 and 156. The sprocket chain 152 is provided with a connector 158 to which there is suitably connected a valve rod 160 which operates both the pressure relief plate 136 and the main valve plate 130, as is well known to those skilled in the art. As previously indicated, after the relief plate or pilot valve 136 has reached its upper end position the drive unit 142 is de-energized and this is effected by means of a pilot valve switch PVCVII. The switch is suitably mounted on a support 162 and is provided with a contact operating roller 164. The connector 158 mounts a depending guide 166 adapted to coact with the roller 164, the guide 166 having a camming surface 168 at the lower end thereof. When the pressure relief plate 136 is in the closed condition thereof, the roller 164 is engaged with the member 166 adjacent its upper end thereof, as best shown in Figure 7. However, when the drive unit 142 operates to move the rod 160 to carry the relief plate 136 to the upper position thereof illustrated in Figure 12, it will be understood that the spring biased roller 164 moves outwardly along the camming edge 168 of the member 166 interrupting the pilot valve switch PVCVII to interrupt the energizing circuit for the electrical drive unit 142, as hereinafter explained in detail. After the relief plate has been opened, and the current to the drive unit 142 interrupted, a pressure equalization can take place between the hot blast stove HBS and the associated flue 48. After pressure equalization has been established, the current through the drive unit 142 is re-established by means of a contact manometer chimney valve CMCVII (Figure 18), as hereinafter explained in detail. The electrical drive unit 142 then operates again to open the main valve plate 130.

The connector unit 158 is provided with a forked lever 170 which rides along a switch rod 172 which mounts a collar 174. It will be understood that the drive unit 142 is operable to raise the connector unit 158 so that the lever 170 engages the collar 174, as shown in full line in Figure 13, and to raise the latter to the broken line position thereof for raising the switch rod 172. The switch rod 172 mounts a switch operating member 176 provided with a notch 178 which is adapted to engage the crank arm 180 of a lever limit switch CVIS or CVIIS, for chimney valve CVI or CVII, as the case may be. The lever limit switches CVIS and CVIIS are similar in construction to the previously described lever limit switches GVS and BVS. It will be apparent that when the connecting unit 158 is moved from the full line to the proken line position thereof shown in Fig. 13, the crank arm 180 of the limit switch CVIS or CVIIS is operated from the position thereof shown in Fig. 13 to the position thereof shown in Fig. 14.

A compression spring 177 is mounted in a housing 179 at the upper end of the switch rod 172. The spring 177 constitutes provision so that the internal spring in the switch CVIS or CVIIS does not have to carry the whole weight of the switch rod 172.

After the first chimnuey valve CVII is opened, as described the second chimney valve CVI is opened. However, as previously described, the chimney valve CVI is not provided with the relief plate 136. Consequently, it will be apparent that once the drive unit 142 for the chimney valve CVI is operated, the main valve plate 130 thereof is opened without interruption during the opening movement thereof, until it reaches its upper end position whereupon the associated limit switch CVIS is operated to interrupt the associated drive unit 142, as hereinafter described in detail.

The cold blast valve CBV is similar in construction to the chimney valve CVII being provided also with a pressure relief plate 136, so that it will be readily apparent that each of Figures 7–14 inclusive apply as well to the cold blast valve CBV. In this connection, it will be understood that after the drive unit 142 of the cold blast valve CBV is energized to open said valve, the relief plate 136 thereof is opened, whereupon the current to the associated drive unit 142 is interrupted, exactly as in the case of the chimney valve CVII. With the relief plate 136 of the cold blast valve CBV open, the hot blast stove HBS may now be filled with the blast pressure which is present in the cold blast main CBM. Once the blast pressure in the hot blast stove is equal to the blast pressure in the cold blast main, the current to the drive motor 142 of the cold blast valve CBV is then re-established through a contact manometer (Figs. 17–18) and the main plate 130 of said valve is opened. Similarly, when the main plate 130 thereof reaches the uppermost position thereof to open the valve, the current to the associated drive unit 142 is interrupted by means of an associated lever limit switch CBS.

As in the case of each of the previously described valves and the associated mechanism therefore, the hot blast valve HBV is also of conventional construction, said valve being illustrated in Figs. 15 and 16. The hot blast valve is provided with a drive unit 182 which operates through a chain linkage 183 and associated sprocket wheels 184, 186, 188 and 190 to raise and lower a valve rod 192 for raising and lowering a valve plate 194 in exactly the same manner as previously described for both the chimney valves CVI and CVII and the cold blast valve CBV provision also being made for a lever limit switch HBS operated through the medium of a switch rod 196 by a connector mechanism 198, in the same manner as previously described in connection with the cold blast valve to interrupt the energization of the drive unit 182 when the valve plate 194 is in the raised position thereof.

The closing operation for each valve takes place in a sequence opposite that described above for the opening operation of each valve. The circuits for opening and closing each valve are hereinafter explained in connection with Figures 17 and 18. The current for the drive unit of each valve is interrupted when the valve plate for each valve reaches its lower end or closed position, said interruption occuring through the medium of the associated lever limit switch. In the case of the chimney valve CVII, which is provided with the relief plate or pilot valve 136, and in the case of the cold blast valve CBV which is also provided with the relief plate or pilot valve, the current to the associated drive unit is not interrupted between the upper or open and the lower or closed position of the associated main valve plate 130, said current being interrupted only after said main valve plate reaches its lower end or closed position, the interruption being effected by the associated lever limit switch, as previously described.

The normal hot blast stove changing operations have been described above and, in connection therewith, there have been described the various valves and switches associated with the various stoves. In addition to the previously described operations, provision is made for a special switching operation which is outside the normal working operations previously described. This special switching operation is initiated when the blast furnace is shut down, and the purpose of this special switching operation is to lead off by the natural draft available in a stove and the stack connected with the stoves the residual gases from the furnace through the hot blast main 52 and the stove HBS taken in back draft condition. As previously indicated, and as shown in Figure 1 for the hot blast stove identified as HBS1, when said stove HBS1 is set "on blast," the blast flows out the cold blast main through the cold blast valve, the checker work and the combustion chamber of the hot blast stove and out through the hot blast valve into the hot blast main, and through the blast furnace, said flow being indicated in broken line in said stove HBS1. Stove HBS2 indicates the condition of the flow in a stove set "on gas." As shown in broken line therein, combustion air is drawn in by the fans through the combustion air pipe 38, which is provided with a combustion air butterfly valve, into the burner housing 60, into which there is also drawn gas from the gas main 34 through the gas pipe 32. The gas and the combustion air pass through the burner housing 60 and the burner shut-off valve BV into the combustion chamber and through the checker work, flowing therefrom out through both of the chimney valves CVI and CVII into the flue 44 to the stack. However, when the blast furnaces are shut down, it is necessary to lead off the gases arising in the furnace when the furnace is not working, through the tuyere, the bustle pipe BP, the hot blast main 52, through the hot blast stove HBS1, as shown in Figure 2, and the flue 44, to the stack, and thereby to render said gases harmless, said flow being indicated in broken line in Figure 2. The operation is also known as "back draft" because of this backward suction by means of the stack draft.

In the present system, backdrafting is performed through the stove which is on gas in order to prevent the possibility of an explosion which might occur if the gases from the furnace were backdrafted through a stove insufficiently hot to ignite the gases. If the backdrafting were performed through a cold stove, the gases from the furnace being an explosive mixture present a very great danger of exploding in the stove or in the stack because air which is admitted to the stove in order that the gases may be burned out in the stove forms the explosive mixture with the gases admitted to the stove from the furnace. However, when the stove is too cold the gases would not be ignited in the stove but might be ignited in the stack or chimney if it is hot enough at that time. Even if the chimney were not hot and under that condition the explosion would not occur, nevertheless it is of the utmost importance to prevent the presence of an explosive mixture because the latter always presents a source of great danger because some spark or other ignition might set off the explosion.

In order to bring a hot blast stove HBS, e.g. HBS1, into back draft position, it is necessary for both of the other hot blast stoves, for example HBS2 and HBS3, to be brought into "stove bottled position," that is, all the valves on both the hot blast stoves HBS2 and HBS3 must be closed when stove HBS1 is to be placed on back draft. The hot blast stove HBS1, which is to be brought into back draft condition, is first changed to "on gas" condition as previously described. In this condition, the gas shut-off valve GV, the burner shut-off valve BV and both chimney valves CVI and CVII of the stove HBS1 are opened. The back draft operation is then started by means of a special independent back draft switch BDS which is mounted on the control panel of the stove, and which is shown in the wiring diagram illustrated in Figs. 17 and 18. By changing this back draft switch BDS, the currents to both the other hot blast stoves HBS2 and HBS3, as hereinafter described in connection with said wiring diagram, are interrupted so that the various valves in both of said stoves cannot be operated as long as the hot blast stove HBS1 is in back draft position. After the back draft switch BDS is operated to interrupt the various control currents in the other two hot blast stoves, the hot blast valve HBV of the stove which is being put on to back draft operation is opened by means of a hot blast valve operating switch HBOS which is also located at the control panel of each stove and which is shown in the previously mentioned wiring diagram.

In placing a stove in back draft condition, the stove is intentionally changed to "on gas" condition so that there is provided by means of the flame of the burner 30 of said stove, an ignition flame for the combustible gases refluxing from the blast furnace BF. The combustion air for the combustion of the gases refluxing from the blast furnace is obtained by choking the gas volume flowing through the burner 30 from the gas main 34 so that a greater volume of excess air is laid up by means of the combustion air butterfly valve CABV in the combustion air connecting pipe 38 to the burner 30, as shown in broken line through said combustion air connecting pipe in Fig. 2, and the burner B of the hot blast stove therefore burns with a smaller flame and a higher amount of excess air. This measure makes it unnecessary to use only that particular hot blast stove HBS for the back draft operation which was previously "on gas" and is therefore the most highly heated up hot blast stove HBS.

In the usual back draft method previously employed, that hot blast stove which had previously been on gas is always changed into backdraft condition because it is the most highly heated up of the hot blast stoves. By opening the burner door to the combustion chamber, combustion air is delivered only to the gases refluxing from the blast furnace. The gas-air mixture thereby created must be ignited by means of the temperature of the masonry which is above ignition temperature. While, pursuant to the method utilized in the present invention, the ignition flame of the burner is certain to ignite the refluxing gases. Moreover, the buoyant force in the combustion chamber 40, created by the flame of the burner is in any case sufficient to be able to exhaust the gases refluxing from the blast furnace BF.

As previously indicated, each hot blast stove HBS is provided with a control panel on which there is mounted a back draft switch BDS, a hot blast operating switch HBOS and a control selecting switch CSS, each of which is shown in the wiring diagram illustrated in Figs. 17 and 18. The control selecting switch CSS is a four position switch having the four separate positions for "on gas," "on blast," "bottled from gas," and "bottled from blast." The back draft switch is a two position switch having the positions "stove automatic" and "back draft." The hot blast operating switch HBOS is a three position switch which is utilized for the operation of the hot blast valve during the draft operation. The positions of this switch are "hot blast valve open," and "intermediate or zero position" and a "hot blast valve closed" position. In addition, there is provided on the control panel a pilot light which indicates that control current for the operation of the various valves has been established.

The control panel for each stove is provided also with a stove symbol 200 as shown in Figures 23A, 23B and 23C for indicating to the attendant the particular operating condition of each of the hot blast stoves. Each symbol 200 is provided with valve position indicators for the various control valves, which indicators are shown as flow direction indicators. The indicator for the gas shut-off valve GV is shown at 202. The indicator for the burner shut-off valve BV is shown at 204. The indicator for the hot blast valve is shown at 206. The indicator for chimney valve CVII, which is provided with the relief plate, is shown at 208, the indicator for the other chimney valve CVI being shown at 210. The indicator for the cold blast valve CBV is shown at 212. The arrangement is such that each indicator provides a band of light to show the condition of its associated valve, namely whether the valve is in open or in closed condition. In addition, if the valve is neither in its open or closed condition but is moving to or from one or the other of said conditions, the indicator also notes this condition. More specifically, and as best shown in the indicator 204 of the stove symbol designated at Figure 23B, each symbol has five light bulbs arranged in a cross. The center light bulb is indicated at 216, which is intermediate the horizontally disposed light bulb 218—218, and also intermediate the vertically disposed light bulbs 220—220. The light bulbs are mounted in a suitable housing 222, as best illustrated in Figure 24. The arrangement is such that the central light bulb 216 in each indicator is always energized, as hereinafter described in detail, the energization of the horizontally related bulbs 218 forming with the central bulb 216 a horizontal light band and the energization of the vertically related bulbs 220 forming with the central light bulb 216 a vertically related light band. In the symbol shown in Fig. 23A, a horizontal light stripe is shown at each indicator, indicating that the associated stove is "on gas." In Fig. 23C, all of the indicators present a vertical light band indicating that the associated stove is "on blast." In Fig. 23B, the light bands in the various indicators are tangent to the circumference of the symbol indicating that the stove is "bottled from gas." In any case, where the sole light visible in any indicator is only the intermediate or center light 216, which is the only light energized, said condition indicates that the associated valve is moving and has not reached either an open or a closed condition thereof. Each symbol also is provided with two additional light bulbs at the center thereof in the positions indicated at 222 and 224, respectively, said light bulb being preferably red. The light bulb 222 is energized whenever the previously mentioned fan 36 is energized to indicate that the fan motor is running so that combustion air is being delivered to the burner. The light at position 224 indicates that the ignition device (not illustrated) of the associated burner is energized. The foregoing operation of the various light bulbs 218 and 220 results from the operation of the previously described lever limit switches associated with the various valves.

Referring now to Figure 25, there is a schematic representation of the various conditions assumed by the bridging contacts 110 of each conventional lever limit switch. The rotary drum shaft 104 of each lever limit switch is shown in three different positions through which it passes in response to the operation of the switch. Position 104A is taken as the zero or neutral position, a positive position 104B being designated as a position which is removed from position 104A by minus thirty degrees, and position 104C indicating a thirty degree rotation in the opposite direction from the zero position, and being indicated as a position at plus thirty degrees from the zero position. The lever limit switch for each valve has a first series of stationary contacts designated 1–6, respectively, and an associated series of stationary contacts designated 11–16 respectively. In addition, the lever limit switch for the burner shut-off valve is provided with the additional stationary contacts indicated at 7 and 8 and the associated stationary contacts indicated at 17 and 18. The lever limit switch for the chimney valve CVII is provided with the six additional stationary contacts 7, 8 and 9 and their associated contacts 17, 18 and 19. The lever limit switch for the cold blast valve CBV is provided with four additional stationary contacts as in the case of the lever limit switch for the burner shut-off valve. The lever limit switch for the hot blast valve is provided with eight additional stationary contacts 7 through 10 and their associated contacts 17–20 respectively. It will be understood that the chimney valve CVI and the gas shut off valve are provided only with the first series of stationary contacts 1 through 6 and their associated contacts 11 through 16 respectively. The connections of these various contacts into the control circuit is hereinafter described in connection with Figures 17 and 18. It will be understood that whenever an associated pair of contacts 2 and 12 are closed by the bridging contact member 110 the horizontally disposed bulbs 218 are energized, as shown in the position of the shaft 104B. Whenever the contacts 3 are closed with the associated contacts 13 by the bridging contact member 110 the vertically disposed light bulbs 220 are energized as shown in the position 104C of shaft 104. Consequently, it will be apparent that the contacts numbered 2 are utilized for the closed positions of the cold blast and the hot blast valves and for the opened position of the gas shut-off valve, the burner shut-off valve and both of the chimney valves. On the other hand, the contacts 3 are used to indicate the closed positions of the gas shut-off valve, the burner shut-off valve and both the chimney valves and for the open positions of the cold blast valve and the hot blast valve.

In addition to the switching operations provided by the various lever limit switches associated with the various valves, there is also provided on the rear of each stove control panel (not illustrated) a stove interlock switch SIS which is shown in Figure 18. This is a manually operable switch having a movable contact 228, a first stationary contact 230, and a second stationary contact 232 selectively engageable by said movable contact 228. The switch SIS on each stove control panel serves to unlock the hot blast stoves from each other. In this connection, it will be understood that there are certain special conditions of blast furnace operation which make it necessary to disengage the circuit interlocking of the various hot blast stoves by operation of the interlocking switch SIS. As previously indicated, it is absolutely essential that a continuous blast flow be assured to the blast furnace BF. To achieve this, the particular hot blast stove HBS which is "on gas" must first be changed over to "on blast." The stove interlocking switch SIS functions to prevent mistaken switching. As long as said switch SIS is closed at contact 230, the hot blast valves of the three hot blast stoves are so interlocked with one another that a hot blast valve cannot be closed until (during the change to "on blast") another hot blast valve of another stove has been opened, the latter stove being changed to "on blast."

It sometimes is necessary during blast furnace operations, for example during the shut down of the blast furnace BF or during any other unusual operating situation, that the furnace must be taken from blast. In this case, nevertheless, it is necessary that all three hot blast valves be closed. Since it is not possible to close all the hot blast valves on all the stoves as long as the stove interlocking switch SIS on any stove is closed at contact 230, the stove interlocking switch must be operated to close at contact 232 for this special condition. That is, the interlocking of the hot blast stoves with one another must be interrupted before it is possible to close all of the hot blast valves on the three stoves. In order to prevent the stove interlocking switches SIS being operated through any inadvertence, and thereby cause an accident, it is intentionally placed in each case on the rear of the associated stove control panel.

As previously indicated, the present invention relates essentially to the system for controlling the change-over of the various stoves from the previously described conditions thereof. The stove-changing control system is based upon the previously described lever limit switches, each of which is operated in response to the operation of the associated valve, as described, so that the movable valve plate of each valve must be in a particular position to provide the particular position of the shaft or drum 104 provided with the bridging elements 110 to close or open the associated stationary contacts. Each lever limit switch, as previously described, has a minimum of eight contact bridging elements 110 and the corresponding positions of said elements 110 in each of the three different switch positions are clearly illustrated in said figure.

*Stove changing to "on gas" condition*

Referring now to Figures 17 and 18 in detail, there is shown the complete wiring diagram for one of the hot blast stoves it being understood that the wiring diagram for each of the other stoves is exactly the same and it being understood that the various wiring diagrams or circuits for the various stoves are interconnected, as hereinafter described in detail. Each stove is provided with a manually operable control selecting switch CSS which has four different positions. More specifically, the switch CSS, which is of conventional construction, has four separate contact bridges 234, 236, 238 and 240 which are selectively closed by operation of a manual finger control 242 through the intermediation of the cams 244 and 245. When the control element 242 of the control selector switch CSS, which is mounted on the control panel of the associated stove, is set for stove "on gas" the contact bridges 234 and 236 are engaged across the associated stationary contacts, as illustrated in Figure 17, with the contact bridges 238 and 240 open. The remaining positions of said switch will be described in connection with Figures 19, 20 and 21 respectively, which illustrate other control conditions for the hot blast stoves. Each control selector switch CSS includes a safety switch SS which operates to interrupt the circuit during the rotation of the control element 242 of the control selector switch CSS, so that during movements of the latter no current flows through the system. Figure 17 shows a control selector switch, which is identified as ICSS for one of the stoves, and the associated safety switch which is indicated at ISS, the safety switches for the other two stoves being indicated at IISS and IIISS, respectively. Each switch CSS is also provided with a built-in pilot light 246 which indicates if the control current is flowing to the system when the switch is in one of the four possible positions thereof to condition its associated stove for "on gas," "on blast," "bottled from gas" or "bottled from blast," respectively.

Provision is also made on the control panel for a back draft switch BDS which in Figure 18 is designated as IBDS since it represents the back draft switch for the hot blast stove HBS1. The back draft switch is a two position switch having a first position for automatic control of the stoves and a second position for back draft position. As shown, this switch has nine sets of stationary contacts. In the back draft position, four sets of contacts are closed to allow the current to flow through the hot blast valve operating switch, for closing or opening the hot blast valve separately and closing the electrically operated mixed blast valve, and in the normal or automatic position, as illustrated in Figure 18 five sets of contacts are closed to provide the normal interlock sequence. The control panel for each stove also includes a hot blast valve operating switch for opening or closing the hot blast valve, this switch being designated as HBOS and being shown in Fig. 18, as IHBOS to designate the hot blast operating valve for the stove designated as stove HBS1. The hot blast valve operating switch has a movable contact 248 which bridges the stationary contacts 250 and 252 in the open condition of the hot blast valve and bridges the stationary contacts 254 and 256 in the closed condition of the hot blast valve.

Referring now to Figures 17 and 18 in detail, the apparatus is supplied from a suitable alternating current source through a main disconnect switch MDS, through the three power lines L1, L2, and L3. A transformer T1, connected across the power lines L1 and L2 steps down the voltage to lines L4 and L5 across which a second step-down transformer T2 is connected for supplying the various previously described bulbs in the indicators 200. It will be noted that the central bulb 216 in each indicator is connected across the secondary of the transformer T2, so that said bulbs are always lit when both the main disconnect switch MDS and the main control switch MCS are closed.

In changing the stove to "on gas" condition, the various back draft switches BDS of all of the stoves are in the automatic position thereof as shown for example in the back draft switch IBDS for stove HBS1 in Figure 18, portions of the back draft switches for the other two stoves being shown at IIBDS and IIIBDS in Figure 17. The current is supplied from the power line L4 through the power line L6 through the closed contacts 2—2 of the back draft switch IIBDS, through the line L7 through the closed contacts 2—2 of back draft switch IIIBDS and through the line L8 to the contact breakers for the hot blast stove HBS1. More specifically, as previously indicated and as shown in Figure 10, the manually operable drive switch MODS associated with the hand drive 120 for each valve is in the closed condition thereof when the valve is being operated by the electrical drive unit, but is opened automatically in response to operation of the valve by the associated hand drive 120. Consequently, in the automatic operation, it will be apparent that the switch MODS for each electrically operated valve is in closed condition in the automatic operation of the associated valves. More specifically, since there are six automatically operable valves, namely the gas shut-off valve, the burner shut-off valve, the chimney valve CVI, the chimney valve CVII the cold blast valve and the hot blast valve, there are consequently six associated MODS switches. It will be understood that these six switches are connected in series and there are schematically indicated by the box 270 in Figure 17. The similar series of six switches for the second hot blast stove is indicated at 272 and the similar series of six MODS switches for the third hot blast stove is indicated at 274. Consequently, it will be apparent that if any one of the valves is operated by its associated manual drive, the circuit is broken at the series connected MODS switches for the associated stove.

The circuit continues from the MODS switches 270, through the safety switch ISS through the pilot light 246 and the line L9 to the other power line L5. Consequently, it will be apparent that if either of the back draft switches IIBDS or IIIBDS, on the two other stoves, is in back draft position, and not in automatic position, there will be no input for operating the circuit through the lines L6 and L8. This, of course, would prevent the completion of a circuit for operating the stove HBS1. In addition, with either of the back draft switches of the two other stoves open, the pilot light 246 would be extinguished, indicating to the attendant that stove HBS1 cannot be operated to change the condition thereof until the back draft switches on either or both of the other two stoves, as the case may be, is closed.

In tracing the operating circuit for changing the stove to the "on gas" condition thereof, as previously indicated, the circuit continues from the safety switch ISS through the lead L10 and the bridging contact 234 of the selector switch ICSS which, with said switch set for "on gas" condition, bridges the stationary contacts 1—1 of said switch. From the engaged stationary contacts 1—1 of said switch, the circuit continues through the lead L11, through the associated stove interlock switch ISIS, which is closed at its contact 230. From the stationary contact 230 there is a first lead L13 going to the same switch for stove HBS2, indicated at IIHBS. If either one of the hot blast valves in either stove HBS2 or in stove HBS3 is open, that means that that stove is "on blast" and consequently, both the contacts numbered 6 and 7 for the stove which is "on blast" are closed, as will be readily apparent from Figure 25 with the drum 104 at the position 104C thereof. Assuming now that stove HBS3 is on blast, the stationary contacts 7 and 17 of the associated switch IIIHBS are closed so that the circuit then continues through the lead L14 to the stationary contact 232 of the switch ISIS. From the latter the current flows through the lead L15 and through the bridged contacts 4—4 of the associated back draft switch IBDS, which contacts are closed in the non-back draft position of said switch, and from the latter through the lead L16 to stationary contact 5 of the associated hot blast valve switch IHBS. Contacts 5 and 15 of said switch are bridged when the associated hot blast valve is open, the lever limit switch IHBS being in the plus 30 degree, or 104C condition, as shown in Figure 25. In this connection, it will be noted that when each of the gas shut-off, burner shut-off and both chimney valves are closed, their associated limit switches are in the plus 30 degree position, being in the minus 30 degree position when said valves are open. However, the associated lever limit switches for the cold and hot blast valves are in plus 30 degree position when the valve is open and in minus thirty degree position when the valve is closed.

A reverse operating motor for operating the hot blast valve in opening and closing directions is schematically indicated at M6. The motor is connected through a normally closed emergency switch ES6 to the power lines L1, L2 and L3 by a reverse contactor RC6, which includes an opening solenoid OS6 and a closing solenoid CS6. It will be understood that the arrangement is conventional and that the closing solenoid, when energized, connects the motor M6 to the power lines for operating to close the valve and similarly the opening solenoid when energized connects the motor M6 to the power lines to open the hot blast valve. The contact 15 of the hot blast valve switch IHBS is connected through the lead L17, through the closing solenoid CS6 and from the latter through the engaged contacts 280 of the opening solenoid OS6 and from the latter by the lead L18 to the control current line L19 which is connected to the power line L5.

The motor M6 being energized in a direction to close the hot blast valve, the movable plate 194 (Fig. 16) of the latter is operated from its raised to its lowered position thereof, as illustrated in said figure and when the valve plate reaches the illustrated position thereof its associated lever limit switch will be in the minus 30 degree position, as illustrated in Fig. 25 with its rotor or drum being at the 104B position thereof so that its contact 5—15 will be open and its contacts 1—11 will be closed. The current now flows from the lead L16 through the lead L20, the engaged contacts 1—11 of the associated lever limit switch designated IHBS, through the lead L21, the engaged contacts 8—8 of the back draft switch IBDS, through the lead L22 and the lead L23 to the stationary contact 5 of the cold blast valve lever limit switch ICBS. Said switch is in the plus 30 degree or 104C position of its rotary drum, as shown in Figure 25 so that current flows through the bridge contacts 5—15 and through the lead L24 to the reverse contactor RC5 which is similar to the previously described reverse contact RC6.

Reverse contactor RC5 is also provided with a closing solenoid CS5 and an opening solenoid OS5 for the motor M5, which is a reversible motor for operating the cold blast valve. As in the case of the motor M6, the energizing circuit for the motor M5 is completed through the coil of the closing solenoid CS5 and the closed contactors 282 of the opening solenoid OS5 to the power line L19, whereby the motor is connected through the emergency switch ES5 through the associated power lines L1, L2 and L3 to operate in a direction for closing the associated cold blast valve. As in the case of the hot blast valve, as previously described, when the valve plate of the cold blast valve is in its lowermost or closed position, the motor energizing circuit is interrupted at the now disengaged contacts 5—15 of the associated switch ICBS and the contacts 1—11 of said switch are now bridged. The current now flows from the lead L22 through the bridge contacts 1—11 of switch ICBS through the lead L25 to the bridged contacts 2—2 of the associated control selecting switch ICSS and through the lead L26 to stationary contact 5 of the lever limit switch ICVIIS for the chimney valve ICVII. This contact is bridged with stationary contact 15 when the associated chimney valve is closed, or at the plus 30 degree position thereof, and the circuit continues from the stationary contact 15 through the lead L27, through the bridged contacts of the pilot valve chimney valve switch IPVCVII, said switch being a limit switch which is closed when the pilot valve plate 136 is in its closed position, as illustrated in Figure 11. The circuit continues through the closed limit switch IPVCVII and through the lead L28 to the opening solenoid OS4 of a reverse contactor RC4 for the motor M4 for the associated chimney valve CVII. The circuit is completed through said opening solenoid OS4 and the closed contacts 284 of the associated closing solenoid CS4 to the power line L19. The motor M4 is now energized through the emergency switch ES4 to the power lines L1, L2 and L3 in a direction to open the relief plate 136. When the relief or pilot plate 136 is in its fully opened position, as illustrated in Figure 12, the energizing circuit for the opening solenoid OS4 is interrupted by the lever limit switch IPVCVII, which opens in response to said movement of the pilot plate.

After the pressure in the associated hot blast stove is relieved, through the opening in the main valve plate 130 resulting from the open position of the relief plate 136, to atmospheric pressure, provision is made to operate the main valve plate 130 of the associated chimney valve to the open position thereof. More specifically, provision is made for a contact manometer ICMCVII which responds to the pressure in the stove so that when the pressure in the stove is equal to atmospheric pressure, the stationary contact 286 of the manometer is engaged by the movable contact 288 thereof. The stationary contact 286 is connected through lead L29 to the contact 7 of the associated chimney valve switch ICVIIS, and from the associated bridged stationary contact 17 through the lead L30 to one end of the six serially connected MODS switches designated collectively as 270 which, as previously indicated are connected through the lead L8, the closed contacts 2—2 of switch IIIBDS, through lead L7, through the closed or bridged contacts 2—2 of switch IIBDS and through the lead L6 to the power line L4. The movable contact 288 of the manometer switch ICMCVII is connected to one end of a coil of an auxiliary relay for the chimney valve CVII which is designated as IARCVII. The other end of the coil is connected through lead L31 to the power line L5 whereby said coil is energized so as to close its contacts to shunt the open switch IPVCVII, so as to close the energizing circuit for the opening solenoid OS4. The motor M4 is again energized and operates to move the main valve plate 130 of the chimney valve CVII to the open position thereof. When said main valve plate reaches the upper end or open position thereof, the bridged contacts 5—15 of the associated lever limit switch ICVIIS are opened and the contacts 1—11 of said switch are closed as indicated in the minus 30 degree position of the switch in Figure 25. The current now flows from the lead L26 through the lead L32 and through the bridged contacts 1—11 of said switch and then through the lead L33 to stationary contact 5 of the limit switch for chimney valve CVI, which switch is designated as ICVIS. In the closed condition of the chimney valve CVI, the contacts 5—15 of its limit switch are bridged so that the current flows through said contacts and through the lead L34 to the opening solenoid OS3 of the reversing contactor RC3 for the motor M3 for chimney valve CVI to open the valve plate thereof. The circuit for the opening solenoid OS3 is completed through the engaged contacts 287 of the closing solenoid CS4 to the power line L19. The motor M3 is now energized through the closed emergency switch ES3 to the power lines L1, L2 and L3 for opening the valve plate for the valve of the chimney valve CVI. When the valve plate reaches its upper end or fully opened position, the associated lever limit switch ICVIS is operated so as to disengage the contacts 5—15 thereof and close the contacts 1—11 thereof. The current now flows from the lead L33 through the closed contacts 1—11 of the switch ICVIS through the lead L35 to the stationary contact 5 of the limit switch IBVS for the burner shut-off valve BSV. With said valve in the closed or plus 30 degree position thereof, as shown in Figure 25, its contacts 5—15 are bridged so that current flows through said contacts and the lead L36 to the opening solenoid OS2 of the reverse contactor RC2 for the motor M2 which operates the burner shut-off valve. The opening circuit for the reverse contactor RC2 is completed through the engaged contacts 289 of the closing solenoid CS2 to the power line L19. The motor is then energized through the normally closed emergency switch ES2 to the power lines L1, L2 and L3 so that the burner shut-off valve is now operated to the open condition thereof. After this valve has reached its fully opened condition thereof, its lever limit switch IBVS is operated so as to interrupt the bridged contacts 5—15 thereof and to close the contacts 1—11 thereof. The current now flows from the lead L35 through the bridged contacts 1—11 of the lever limit switch IBVS and through the lead L37 to the stationary contact 5 of the lever limit switch IGVS for the gas shut-off valve. With the gas shut-off valve in the closed condition thereof, its stationary contacts 5 and 15 are bridged so that the current flows through the bridged contacts and the lead L38 to the opening solenoid OS1 of the reverse contactor RC1 for the motor M1 which operates the gas shut-off valve. The complete conventional connections for the reversed contactor RC1 are illustrated and it will be readily apparent those skilled in the art that, the motor M1 can be connected to the associated power lines L1, L2 and L3 either by means of energization of the opening solenoid OS1 to close its associated contacts or by energization of the closing solenoids CS1 to close the associated contacts of the latter whereby the motor will operate in one direction when the solenoid OS1 is energized and will operate in the opposite direction when the solenoid CS1 is energized. It will be understood that the various connections shown for the motor M1 are duplicated in the reversing contactors of each of the other reverse contactors RC2 through RC6 and the associated motors of the latter.

Consequently, it will be apparent that when current is supplied through the lead L38, the energizing circuit for the opening solenoid OS1 is completed through the closed contacts 290 of the closing solenoid CS1 for energizing the motor M1 in a direction to open the closed gas shut-off valve. When the gas shut-off valve has reached its fully open position, its associated lever limit switch IGVS is operated so that the contacts 5—15 thereof are interrupted whereby to interrupt the energizing circuit for the entire system so as to remove power from the system after the last valve plate, in this case the valve plate of the gas shut-off valve, has reached its open position. When the burner shut-off valve BV has reached its fully opened position, the associated lever limit switch IBVS is in the minus 30 degree position thereof shown in Figure 25 with the contacts 7—17 bridged and the contacts 8—18 bridged. The bridged contacts 7—17 complete a circuit to energize the contactor of the associated fan motor so that the fan starts to supply combustion air. The bridged contacts 8—18 close a circuit to a time relay (not illustrated) which is conventional, and which in customary manner energizes the glow wire of the ignition equipment.

In view of the foregoing, it will be apparent that in effecting a change in the condition of the stove from an "on blast" to an "on gas" condition, the operation of the selector switch CSS of said stove to the "on gas" condition thereof resulted in sequential operation in which the hot blast valve was first closed, followed by the closing of the cold blast valve, followed by the opening in two steps of the chimney valve CVII in which first the pressure relief plate was opened to equalize the pressure within the stove with the atmospheric pressure whereupon the main valve plate was completely opened, followed then by the opening of the other chimney valve CVI, which is not provided with a pressure relief plate, followed by the opening of the burner shut-off valve, and finally followed by the opening of the gas shut-off valve which resulted in a complete de-energization of the circuit which initiated the foregoing operation.

The various circuits involved in providing the operation of the stove to the "on gas" condition are shown in heavier lines in Figures 17 and 18. As previously indicated, with the stove in "on gas" condition, the horizontal bands of light are present in the various indicators or symbols for the various valves. As shown in Figure 17, the various light bulbs are illustrated for each of the symbols, S1 indicating the symbol for the gas shut-off valve S2 indicating the symbol for the burner shut-off valve, S3 indicating the symbol for chimney valve CVI, S4 indicating the symbol for chimney valve CVII, S5 indicating the symbol for the cold blast valve and S6 indicating the symbol for the hot blast valve. As previously indicated, the central bulb 216 in each symbol is connected directly across the secondary of the transformer T2 so that said bulb in each symbol is at all times energized when the switches MDS and MCS are closed. In each of the lever limit switches, the contacts 2 and 12 are utilized to energize the additional pair of bulbs, which are on the opposite sides of the central bulb, to provide the particular light strip for obtaining the horizontal band of light. In this connection, it will be noted that for each symbol, the set of bulbs 292 and 294 cooperate with the central bulb 216 to provide the horizontal band of light. It will be noted that in each case, each pair of bulbs 292 and 294 are connected in parallel with one end thereof connected through line L39 to one side of the secondary of the transformer T2, each central bulb 216 being connected between said line L39 and a line L40 to the other side of the secondary of said transformer. The stationary contacts 2 in each of the lever limit switches are connected by a common line L41 to the line L40. The stationary contacts 2 and 12 of the limit switch IGVS is connected by line L42 to the other end of its associated bulbs 292—294. The stationary contact 12 of limit switch IBVS is connected by line L43 to the other side of its associated bulbs 292—294. The stationary contact 12 of lever limit switch ICVIS is connected by line L44 to the other side of its associated bulbs 292—294. The stationary contact 12 of lever limit switch ICVIIS is connected by line L45 to the other side of its associated stationary bulbs 292—294. The stationary contact 12 of the lever limit switch ICBS is connected by line L46 its associated stationary bulbs 292 and 294. The stationary contact 12 of the lever limit switch IHBS is connected by lead L47 to the other side of its associated stationary bulbs 292 and 294. Consequently, it will be apparent that when each of the gas shut-off valve, the burner shut-off valve, the chimney valves CV1 and CV2 are in the open condition thereof, the associated contacts 2—12 of the associated lever limit switches are bridged to light up the associated bulbs 292—294, and when each of the cold blast and hot blast valves are in the closed condition thereof, the contacts 2—12 of the associated lever limit switches are bridged to energize the associated bulbs 292—294.

*Stove changing to "stove on blast"*

The operation and circuitry required to change the stove from "on gas" to "on blast" condition is illustrated in Figure 19. In this connection, it will be noted that Figure 19 is based upon the circuitry illustrated in Figs. 17 and 18 but omits all of the circuits, contacts and components which are not utilized to establish the control circuit for placing the stove "on blast." However, it will be understood that the complete circuit is exactly the same as that which is shown in Figures 17 and 18.

As described in connection with establishing the control circuit for changing the stove to "on gas" condition, the current flow is from the power line L4 to the power line L6, the engaged contact 2—2 of switch IIBDS, through lead L7, through the engaged contacts 2—2 of the switch IIIBDS, through the lead L8, through the six serially connected MODS switches, designated collectively as 270, and to the safety switch ISS. From the latter, the current flow is through the lead L10 to the bridged contacts 3—3 of the selector switch ICSS. It will be understood that when the stove is to be changed to "on blast" condition, the selector switch ICSS is manually operated to said position wherein its contacts 3—3 are bridged and its contacts 4—4 are also bridged. From the engaged contacts 3—3, the current flows through a lead L48 to the stationary contact 10 of the lever limit switch IHBS for the hot blast valve.

In the closed condition of the hot blast valve, its contacts 10 and 20 are bridged. It will be understood that the circuit for changing the stove to "on blast" includes said bridged contacts 10 and 20 of the hot blast valve lever limit switch so as to insure that the hot blast valve, after a backdrafting operation is closed. The circuit continues from stationary contact 20 of the hot blast valve lever limit switch through lead L49 to stationary contact 4 of the lever limit switch IGVS for the gas shut-off valve. The gas shut-off valve being closed, or in the plus 30 degree position thereof, its contacts 4 and 14 are bridged so that the current flows from the latter contact through the lead L50 through the closing solenoid CS1 and the engaged contactors 300 of the opening solenoid OS1 to the power line L19. The motor M1 is consequently energized, as previously described to operate the gas shut-off valve IGVS in a direction to close the latter. After the valve plate of the gas shut-off valve has reached its closed position, the associated switch IGVS will be in its plus 30 degree position so as to interrupt the bridging of the contacts 4—14 and bridge the contacts 6—16. The current will now flow from the lead L49 through the bridged contacts 6—16, through the lead L51 to the stationary contact 4 of the burner shut off valve IBVS. Said valve being in its open or minus 30 degree condition, the contacts 4 and 14 thereof are bridged and current will then flow through the lead L52 to the reversing contactor RC2, flowing through the associated closing solenoid CS2 and the engaged contacts 302 of the opening solenoid OS2 to the power line L19 whereupon the motor M2 is energized in a direction to close the burner shut-off valve. Upon complete closure of the burner shut-off valve, its associated lever limit switch IBVS will be in its plus 30 degree condition whereupon the bridging between the contacts 4 and 14 is interrupted and the contacts 6 and 16 thereof will now be bridged. The current will now flow from the lead L51 through the bridged contacts 6—16 and through the lead L53 to the stationary contact 4 of the lever limit switch ICVIS for chimney valve number 1. Said valve being open, its lever limit switch is in the minus 30 degree position thereof so that the contacts 4—14 thereof are closed whereby current flows through the lead L54 and through the reversing contact or RC3 to energize the closing solenoid CS3 to the engaged contacts 304 of the opening solenoid OS3 for energizing the motor M3 in a direction to close the chimney valve CVI. In the closed condition of said valve, its associated lever limit switch is in the plus 30 degree condition thereof to interrupt the energizing circuit for the motor M3 and to establish a circuit to the now closed or bridged contacts 6—16 to which current flows through the lead L53 to the lead L55 and to the stationary contact 4 of the lever limit switch ICVIIS for the chimney valve CVII, which is provided with the relieving or pilot plate 136, as previously described.

Said chimney valve CVII being in the open position thereof, its associated lever limit switch is also in the open condition thereof so that its contacts 4—14 are bridged and permit current flow to pass therethrough to the lead L56 to the reverse contactor RC4. The current flow through the reverse contactor RC4 is as previously described in connection with the three prior reverse contactors, namely through the closing coil CS4 and the engaged contacts 306 of the opening contacts OS4 to the power line L19 whereby to energize the motor M4 in a direction to close the chimney valve CVII. When the valve reaches its closed condition, its associated lever limit switch is in the plus 30 degree condition thereof whereby to interrupt the energizing circuit for the motor through the now interrupted contacts 4—14 and to establish a circuit through the now engaged contacts 6—16 through which the current flows from the lead L55 to the lead L57. The current now flows back to the associated control selecting switch ICSS, the switch being in the "on blast" position so that its contacts 4—4 are bridged, to permit current flow through the latter to the lead L58 to the stationary contact 4 of the lever limit switch ICBS for the cold blast valve.

With the cold blast valve in its closed condition, its associated lever limit switch is in the minus 30 degree condition thereof, in which its contacts 4 and 14 are bridged so as to permit the current flow through the bridged contacts to the lead L59. The current now flows through the closed contacts of the closed limit switch IPVCB for the relief or pilot valve of the cold blast valve, and through the lead L60, through the opening solenoid OS5 of the reverse contactor RC5 for the cold blast valve. The current flow continues through the engaged contacts 308 of the associated closing solenoid CS5 to the power line L19 whereby to energize the motor M5 for the cold blast valve in a direction to open the cold blast valve. When the motor M5 has operated sufficiently to open its relief or pilot valve, the lever limit switch IPVCB for the pilot valve is opened so as to interrupt the previously described energizing circuit for operating the motor M5 in the opening direction thereof so that the motor stops running immediately.

This permits the cold blast to flow into the stove through the open pilot valve of the cold blast valve and to fill the stove with the same pressure which is in the cold blast main. A contact manometer ICMB is responsive to the cold blast pressure in the stove and when said pressure is equal to the pressure in the cold blast main the movable contact 310 of said manometer engages the stationary contact 312 thereof. It will be noted that when the motor M5 was interrupted, after the opening of the associated pilot valve or relief pressure plate, the lever limit switch ICBS is in the intermediate or zero degree position thereof in which the contacts 6—16 thereof are interrupted and the contacts 7—17 thereof are bridged. The engaged contacts 310—312 of the manometer now complete an auxiliary circuit for energizing the coil 314 of an auxiliary relay IARCB. More specifically, it will be noted that the coil, at one end thereof, is connected by lines L31 to the power line L5. The other end of the coil is connected through the engaged contacts 310—312 of the manometer and through the lead L61, through the engaged contacts 7—17 to the lead L30, which extends to the junction 316 with the safety switch ISS and through the series of MODS switches 270 and through the leads L8, L7 and L6 to the power line L4. The coil 314 being energized, its contacts 318 closed to bridge the open switch IPVCB and again energize the opening solenoid OS5 of the reverse contactor RC5 to again energize the motor M5 in the opening direction thereof. A second auxiliary circuit is established through the engaged contacts 320 of said relay IARCB to provide a holding circuit for the coil 314 so that any fluctuations in the pressure in the cold blast, which may result in the disengagement of the manometer contacts 310 and 312, will not interrupt the closing circuit established through the engaged contacts 318. The motor M5 then continues to operate to open the cold blast valve and when the latter has reached its fully open position, the associated lever limit switch ICBS will be in its open or plus 30 degree position to open the formally engaged contacts 4—14 thereof. However, in said condition of the lever switch, its contacts 6—16 are engaged and current flows through the lead L58 and said engaged contacts and through the lead L62, through the engaged contacts 6—6 of the back draft switch IBDS and through the lead L63 to the terminal 4 of the lever limit switch IHBS for the hot blast valve.

Said valve being closed, the switch is in the minus 30 degree position thereof in which its contacts 4—14 are bridged so that the current continues to flow through said contacts, through the lead L64, through the opening solenoid OS6 of the reverse contactor RC6, and through the engaged contacts 322 of the closing solenoid CS6 to energize the motor M6 of the hot blast valve for operating said motor to open said valve. After the valve plate has reached its uppermost or open position, the associated lever limit switch is in the plus 30 degree condition thereof in which the contacts 4—14 are no longer bridged whereby the current flow through the entire circuit is interrupted.

From the foregoing, it will be apparent that in changing a stove from "on gas" to "on blast," once the control selector switch ICSS is turned to the on blast position thereof, the valves operate in sequence so that the gas shut-off valve closes, followed by the closing of the burner shut-off valve and the closing of chimney valve CVI, the closing of chimney valve CVII, the partial opening of the cold blast valve, or more specifically the opening of the pilot or relief valve thereof to equalize the pressure in the cold blast main and in the stove, after which the cold blast valve continues to open to the fully open condition thereof, followed by the opening of the hot blast valve. As previously indicated, the various valve indicators in this condition present a vertical stripe of light. This results from utilization of the contacts 3—13 of each of the associated lever limit switches. More specifically, each of the valve indicators has associated therewith a pair of light bulbs which are vertically disposed relative to the associated intermediate bulb 216, which is in between said vertically disposed bulbs. Said vertically disposed bulbs for each valve indicator are indicated at 324—324. It will be noted that each of said pair of bulbs 324—324 is connected, at one end thereof, to the lead L39 at the secondary of the transformer. At the other end thereof, each of said pair of bulbs is connected to the stationary contact 13 of the associated lever limit switch. The stationary contacts 3 of each lever limit switch are interconnected through the lead L41 to the other side of the secondary of the transformer T2. As will be apparent from Figure 25, the contacts 3—13 are bridged in the shut or plus 30 degree condition of each of the following lever limit switches IGVS, IBVS, ICVIS and ICVIIS. The plus 30 degree positions in the lever limit switches for the cold and the hot blast valves are the open conditions of said valves, said contacts being also bridged in said position whereby to achieve a vertical illumination stripe for each of the valves with the stove "on blast."

*Stove changing to "stove bottled up from gas"*

The operation involved in bottling the stove from gas requires that all of the six previously described valves on the stove be in closed position. However, this operation is performed only after the stove has been "on gas." As previously described, in connection with Figs. 17 and 18, the operation involved in placing the stove "on gas" requires the closing of the hot blast valve and the cold blast valve, and the opening of the four other valves. Consequently, after the stove has been "on gas" and has been heated to the required temperature, when it is desired to bottle said stove from gas, the cold blast and hot blast valves already being closed, all that remains to be done is to close the other four valves which had been open. In performing this operation, the selector switch ICSS is manually adjusted to the "bottled from gas" position thereof. In this condition of the switch it will be noted that the switch is closed at its contacts 3—3 but is open at its contacts 4—4. The circuitry involved in closing each of the gas shut-off valves, the burner shut-off valve, the chimney valve CVI and the chimney valve CVII is exactly as that previously described in connection with the closing of the same valves as illustrated in Figure 19. However, in the case of Figure 19, which is the condition of the circuit for the stove "on blast" position, the contacts 4—4 of the selector switch ICSS are closed so that the circuit continues after the closing of the second chimney valve limit switch ICVIIS through the engaged contacts 6—16 thereof and through the lead L57 and as previously described through the closed contacts 4—4 of the selector switch. However, in the condition for changing the stove to the "bottled from gas position," as previously described, said contacts 4—4 of the selector switch are open. Consequently, the same sequence of operations as in the case of stove "on blast" is performed as in the case of "bottled from gas" through the closing of the chimney valve CVII, the circuit then being interrupted, after the closing of the contacts 6—16 of the second chimney valve limit switch ICVIIS at the now interrupted contacts 4—4 of the selector switch ICSS, thus preventing the continuation of the circuit through the limit switches for each of the cold and hot blast valves. Consequently, the circuit is interrupted when the valve plate of the second chimney valve CVII is completely closed, the cold blast and hot blast valves remaining in their closed condition, as described so that the stove is now bottled from gas.

In this condition of the stove, the indicators are in the condition thereof illustrated in Figure 23B, it being noted that the various bands of light at the various indicators are each tangent to the circular symbol 200. This condition is indicated in Figure 20, it being noted that the lights for each of the indicators for the gas shut-off valve, the burner shut-off valve and each of the chimney valves are in exactly the same condition as that illustrated in Figure 19 for these valves, the circuitry for energizing the respective lights being exactly the same. However, the indicators for each of the cold blast and hot blast valves, which had remained in the closed condition thereof, are exactly the same as that shown in Figs. 17 and 18, wherein the cold blast and the hot blast valves are also closed, the circuitry for lighting the respective lamps for said two valves in said closed condition thereof being exactly the same as that shown in Figs. 17 and 18.

*Stove changing to "stove bottled up from blast"*

As previously described, before a stove is placed "on blast," it must first be placed "on gas." In placing the stove "on gas" the hot blast and the cold blast valves are closed followed by the opening of the second chimney valve, the first chimney valve, the burner shut-off valve and the gas shut-off valve. Thereafter, in placing the stove "on blast," each of the gas shut-off valve, the burner shut-off valve, the chimney valve CVI and the chimney valve CVII are closed, followed by the opening of the cold blast valve and the hot blast valve. With the stove in this condition where it is "on blast," the stove may be "bottled from blast" if desired. With the stove "on blast" the only two valves open are the cold blast valve and the hot blast valve, and the operation involved in "bottling the stove from blast" involves the closing of said open valves. The necessary circuitry for achieving this operation is shown in Figure 21. When the selector switch ICSS is turned to the stove "bottled from blast" position thereof the contacts 1—1 thereof are engaged, as illustrated, all of the remaining contacts being disengaged or open. In this condition of the switch, as previously described in connection with Figure 17, there is current flow from the power line L4 to the safety switch IISS, and through the latter, through lead L10 and through the engaged contacts 1—1 of the selector switch. From the latter, the current flows through the lead L11 to the movable arm 228 of the stove interlocking switch ISIS. Said stove interlocking switch will normally be in the position thereof illustrated in Figure 18 so that the movable contact will be engaged with the stationary contact 230 thereof, as illustrated, and current will then flow through said interlocking switch through either the engaged contacts 6—6 of the hot blast valve switch IIHBS for stove HBS2 or through the engaged contacts 7—7 of the hot blast switch IIIHBS for stove HBS3, as shown in Figure 18, so insuring that one of these hot blast valves, in one of the other two stoves is in open position, and back through the lead L14 to the stationary contact 232 of said interlock switch. However, if it should be necessary to bottle up a stove from blast, when no other stove is providing blast to the furnace, the stove interlocking switch ISIS, which as previously indicated is mounted behind the control panel of the respective stove, is operated so that said switch will be engaged at its stationary contact 232, as illustrated in Fig. 21, thereby over bridging the contacts 6—6 of the hot blast valve switch for stove HBS2 and the contact 7—7 of the hot blast switch for the stove HBS3 by the short circuit connection established by the movable contact 228 and the stationary contact 230. In either event, the circuit continues from the stationary contact 232 through the lead L15 as previously described, and the engaged contacts 4—4 of the back draft switch IBDS, which contacts are bridged in the non-back draft position of that switch, and through the lead L16 to the stationary contact 5 of the lever limit switch IHBS for the hot blast valve. The contacts 5 and 15 of said lever limit switch are engaged when the hot blast valve is in the open position thereof, whereby said lever limit switch is in the plus 30 degree position thereof, as described, so as to energize the associated motor M6 for the hot blast valve through the closing solenoid CS6 thereof, as previously described. When the associated hot blast valve is completely closed, the contacts 5—15 of the associated lever limit switch are interrupted and the contacts 1—11 of said switch are closed, as previously described. The current now flows through the engaged contacts 1 and 11, and through the previously identified lead L21 through the engaged contacts 8—8 of the back draft switch IBDS and through the previously identified lead L22 to the stationary contact 5 of the lever limit switch ICBS for the cold blast valve. As previously indicated, in the open condition of the cold blast valve, the contacts 5—15 of its associated limit switch are closed so that the current now flows through the associated closing solenoid CS5 to effect the energization of the motor M5 of the cold blast valve, as previously described in a direction to close said valve. When the valve is completely closed, the lever limit switch ICBS is in the minus 30 degree position thereof, wherein the contacts 5—15 thereof are interrupted. The contacts 2—2 of the selector switch, in the present condition thereof, are open so that no continuation of current flow to the chimney valve switch ICVIIS is possible and the whole system is out of power. The condition of the various indicator lights in the "bottled from blast" condition is the same as the condition of the lights in the "bottled from gas" condition since in both conditions all valves are shut, as will be readily apparent from a comparison of Figures 20 and 21.

*Back drafting*

In the back drafting operation all of the valves are opened except the cold blast valve which is closed. Basically, this places the stove, which is to perform the back drafting, in an "on gas" condition so as to assure that the back drafting gases which issue from the blast furnace will flow therefrom through the hot blast exit from the stove, into the combustion chamber of the stove, wherein they will be ignited by a gas flame from the burner of said stove. Furthermore, the arrangement is such that it is assured that all the other stoves have to be in the "bottled up" condition thereof and after the backdrafting operation has been completed, the hot blast valve of the stove which was on back drafting, has to be closed first before it is possible to take that stove to an "on gas" or an "on blast" condition. Generally, it is possible to use any of the stoves for the back drafting operation. In other words, if there are three stoves being utilized for one blast furnace, it is possible to take one of the two stoves which are "on gas" condition for back drafting, or the stove which is "on blast" condition may be used for back drafting. As previously indicated, each stove has a multiple switch which is used for back drafting, said switch being indicated at IBDS for stove HBS1, and a hot blast valve operating switch indicated at IHBOS for said stove. The HBOS switch has three positions, as previously indicated in connection with Figure 18. More specifically, said switch has an open position in which the operating member 248 thereof is engaged across the contacts 250—252, a closed position in which said operating member is engaged across the contacts 254—256, and a zero or neutral position in which the operating member is shown as in full line in Figure 18. This switch is utilized to energize the motor M6 for the hot blast valve. The back draft switch BDS has two different positions, namely a normal stove changing position, as illustrated in Fig. 18 in which its contact sets 2, 2A, 4, 6 and 8 respectively are closed, and its contact sets 1, 3, 5, and 7 are interrupted, and a back drafting position in which its contact sets 1, 3, 5 and 7 are closed (contact sets 5 and 7 not being utilized) and contact sets, 2, 2A, 4, 6 and 8 are interrupted.

In order then to operate a stove for back drafting, its back draft switch BDS is operated from its "stove automatic" to its "back draft" position so as to close those sets of contacts which are illustrated in the interrupted condition thereof in Figure 18, and the hot blast valve operating switch HBOS of said stove is operated to the open position thereof.

With the switches in the foregoing condition, there is established an operating circuit as follows:

From the power line L4 through the line L6, through the closed contacts 2—2 of the back drafting switch IIBDS and through the closed contacts 2—2 of the back drafting stove IIIBDS assuring that the other two stoves are not in back drafting position, and through the series of manual operating disconnect switches MODS, designated 270, to the junction point 316 from which the current then flows through the lead L30, to the now engaged contacts 3—3 of the back draft switch IBDS (assuming that the stove designated as HBS1 is being used for back drafting). See Fig. 22. From said engaged contacts 3—3, the current flows through the lead L101 through the closed contacts 18—8 of the hot blast valve switch for stove HBS2 and through the closed contacts 18—8 of the hot blast valve switch for stove HBS3 thus assuring that these hot blast valves for the other two stoves are in closed condition. From the contact 8 of the switch IIIHBS the current flows through the engaged contacts 8—18 of the lever limit switch IIICVIIS and through the engaged contacts 8—18 of the lever limit switch IICVIIS.

From the latter, the current flows through lead L102 to contact number 1 of the lever limit switch IGVS for the gas shut off valve. The contacts 1—11 of said switch are closed when the gas shut-off valve is in its open position, so insuring that this particular stove through which the back drafting operation is to occur is in "on gas" condition. From contact 11, the current flows through lead L103 to the contact 252 of the hot blast valve operating switch IHBOS. With this switch in its open position, current flows through its movable operating element 248 to the stationary contact 250 through the lead L65 to the stationary contact 4 of the hot blast valve lever limit switch IHBS which is engaged with the stationary contacts 14 and through the lead L64 for energizing the opening solenoid OS6 of the reverse contactor RC6, as previously described, to operate the motor M6 for the hot blast valve in a direction to open the valve.

If any other valve on the cold blast side of the stove, for example a mixed gas valve or a snort valve (neither of which is illustrated) should be included in the interlocking mechanism for the back drafting operation, there is no difficulty whatsoever having the circuit flow through normal limit switches associated with these other valves. The circuit from stationary contact 11 of the lever limit switch IGVS for the gas shut-off valve and the hot blast valve operating switch has to go along these additional valves so that the limit switches of these valves only allow the current to continue to flow therethrough if the valve is in the predetermined position. This means that the mixed blast valve has to be closed and the snort valve has to be opened to atmosphere. The contacts 1—1 of the back draft switch BDS are closed when said switch is in the back draft position thereof, thereby energizing the contactor of the electrically operated mixed blast shut-off valve, so that the latter will be automatically closed by operating the back draft switch BDS from the stove changing position to the back draft position thereof. After back drafting, the hot blast valve HBV will be closed by turning the hot blast valve operating switch HBOS to the closed position thereof. In the closed position of the hot blast valve operating switch, the contacts 254—256 thereof are engaged, as shown in Figure 18, so that the current flows again from the engaged contacts 3—3 of the back draft switch IBDS to the hot blast valve operating switch HBOS, but now overbridging the contacts in the hot blast, chimney and gas valves, and from here to contact 5 of the hot blast valve switch IHBS, which is engaged with the stationary contact 15 thereof, so energizing the closing coil of the hot blast valve reversing contactor RC6.

The condition of the various indicator lights in the back drafting position is shown in the lower left hand corner of Figure 22. It will be noted that the indicators for the gas shut-off valve, the burner shut-off valve and each of the chimney valves are in the open condition thereof, as described in connection with Figure 17, the indicator for the cold blast valve being shown in the closed condition thereof as also described in connection with Figure 17, and the indicator for the hot blast valve being shown as described in connection with Figure 19.

While we have shown and described the preferred embodiments of our invention, it will be understood that various changes may be made in the present invention without departing from the underlying idea or principles of the invention within the scope of the appended claims.

Having thus described our invention, what we claim and desire to secure by Letters Patent, is:

1. In a hot blast stove for a blast furnace, said stove being provided with a hot blast valve, a cold blast valve, a burner shut-off valve, a gas shut-off valve and a chimney valve, said chimney valve comprising a main valve member movable to and from closed and open positions and having a passage therethrough, and an auxiliary valve member movable to and from positions for opening and closing said passage, respectively, mechanisms for operating said valves for said movements, respectively, electrical control means for controlling the actuation of each of said mechanisms in sequential relation, and means operable under the control of the position of said hot blast valve for controlling the operation of the means for operating said main and auxiliary chimney valve members, whereby upon closure of said hot blast valve said auxiliary chimney valve member is first operated to open the passage through the main chimney valve member and thereafter the main chimney valve member is moved to open position.

2. In a hot blast stove for a blast furnace, said stove being provided with a hot blast valve, a cold blast valve, a burner shut-off valve, a gas shut-off valve and a chimney valve, said chimney valve comprising a main valve member movable to and from closed and open positions and having a passage therethrough, and an auxiliary valve member movable to and from positions for opening and closing said passage, respectively, mechanisms for operating said valves, respectively, electrical control means for controlling the actuation of each of said mechanisms in sequential relation, and means operable under the control of the positions of said gas and burner shut-off valves for controlling the operation of the means for operating said main and auxiliary chimney valve members, whereby upon closure firstly of said gas shut-off valve and secondly of said burner shut off valve both said main and said auxiliary chimney valve members are closed.

3. In a hot blast stove for a blast furnace, said stove being provided with a hot blast valve, a cold blast valve, a burner shut-off valve, a gas shut-off valve and a chimney valve, said chimney valve comprising a main valve member movable to and from closed and open positions and having a passage therethrough, and an auxiliary valve member movable to and from positions for opening and closing said passage, respectively, mechanisms for operating said valves, respectively, electrical control means for controlling the actuation of each of said mechanisms in sequential relation, and means operable under the control of the positions of said gas and burner shut-off valves for controlling the operation of the means for operating said main and auxiliary chimney valve members, whereby upon closure firstly of said gas shut-off valve and secondly of said burner shut-off valve both said main and said auxiliary chimney valve members are closed, said electrical control means including a switch operable in response to the positions of said burner shut-off valve to effect the closing of both said main and auxiliary chimney valve members in response to the closing of said burner valve.

4. In a hot blast stove for a blast furnace, said stove being provided with a hot blast valve, a cold blast valve, a burner shut-off valve, a gas shut-off valve and a chimney valve, said chimney valve comprising a main valve member movable to and from closed and open positions and having a passage therethrough, and an auxiliary valve member movable to and from positions for opening and closing said passage, respectively, mechanisms for operating said valves, respectively, electrical control means for controlling the actuation of each of said mechanisms in sequential relation, and means operable under the control of the positions of said hot and cold blast valves for controlling the operating means for said main and auxiliary chimney valve members, whereby upon closure firstly of said hot blast valve and secondly of said cold blast valve said auxiliary chimney valve member is first operated to open the passage through the main chimney valve member and thereafter the main chimney valve member is moved to open position.

5. In a hot blast stove for a blast furnace, said stove being provided with a hot blast valve, a cold blast valve, a burner shut-off valve, a gas shut-off valve and a chimney valve, said chimney valve comprising a main valve member having a passage therethrough and auxiliary valve means for opening and closing said passage, mechanisms for operating said valves, respectively, electrical control means for controlling the actuation of each of said mechanisms in sequential relation, and means operable under the control of the positions of said hot and cold blast valves for controlling the operating means for said main and auxiliary chimney valve members, whereby upon closure firstly of said hot blast valve and secondly of said cold blast valve said auxiliary chimney valve member is first operated to open said passage through the main chimney valve member and thereafter the main chimney valve member is moved to open position, said position control means comprising a lever limit switch operable in response to the opening of said auxiliary chimney valve member to prevent the opening of said main chimney valve member and a pressure-responsive manometer switch operable in response to a predetermined reduction of the pressure in said stove to effect the opening movement of said main chimney valve member.

6. In a hot blast stove for a blast furnace, said stove being provided with a gas shut-off valve, a burner shut-off valve, a chimney valve, a cold blast valve and a hot blast valve, said cold blast valve comprising a main valve member movable to and from closed and open positions and having a passage therethrough, and an auxiliary valve member movable to and from positions for opening, and closing said passage, respectively, mechanisms for operating said valves, respectively, electrical control means for controlling the actuation of each of said mechanisms in sequential relation, and means operable under the control of the position of said gas shut-off valve for controlling the operation of the means for operating said main and auxiliary cold blast valve members, whereby upon closure of said gas shut-off valve said auxiliary cold blast valve member is first operated to open the passage through the main cold blast valve member and thereafter the main cold blast valve member is moved to open position.

7. In a hot blast stove for a blast furnace, said stove being provided with a gas shut-off valve, a burner shut-off valve, a chimney valve, a cold blast valve and a hot blast valve, said cold blast valve comprising a main valve member movable to and from closed and open positions and having a passage therethrough, and an auxiliary valve member movable to and from positions for opening and closing said passage, respectively, mechanism for operating said valves, respectively, electrical control means for controlling the actuation of each of said mechanism in sequential relation and means operable under the control of the position of said hot blast valve for controlling the operating means for said main and auxiliary cold blast valve members, whereby upon closing of said hot blast valve both said main and said auxiliary cold blast valve members are closed.

8. In a hot blast stove for a blast furnace, said stove being provided with a gas shut-off valve, a burner shut-off valve, a chimney valve, a cold blast valve and a hot blast valve, said cold blast valve comprising a main valve member movable to and from closed and open positions and having a passage therethrough, and an auxiliary valve member movable to and from positions for opening and closing said passage, respectively, mechanisms for operating said valves, respectively, electrical control means for controlling the actuation of each of said mechanisms in sequential relation and means operable under the control of the position of said hot blast valve for controlling the operating means for said main and auxiliary cold blast valve members, whereby upon closing of said hot blast valve both said main and said auxiliary cold blast valve members are closed, said electrical control means including a switch operable in response to the positions of said hot blast valve to effect the closing of both said main and auxiliary cold blast valve members in response to the closing of said hot blast valve.

9. In a hot blast stove for a blast furnace, said stove being provided with a gas shut-off valve, a burner shut-off valve, a chimney valve, a cold blast valve and a hot blast valve, said cold blast valve comprising a main valve member movable to and from closed and open positions and having a passage therethrough, and an auxiliary valve member movable to and from positions for opening and closing said passage, respectively, mechanisms for operating said valves, respectively, electrical control means for controlling the actuation of each of said mechanisms in sequential relation, and means operable under the control of the positions of said gas and burner shut-off valves and said chimney valve for controlling the operation of the means for operating said main and auxiliary cold blast valve members, whereby upon closure in sequence of said gas shut-off valve, said burner shut-off valve and said chimney valve said auxiliary cold blast valve member is first operated to open the passage through said main cold blast valve member and thereafter said main cold blast valve member is moved to open position.

10. In a hot blast stove for a blast furnace, said stove being provided with a gas shut-off valve, a burner shut-off valve, a chimney valve, a cold blast valve and a hot blast valve, said cold blast valve comprising a main valve member movable to and from closed and open positions and having a passage therethrough, and an auxiliary valve member movable to and from positions for opening and closing said passage, respectively, mechanisms for operating said valves, respectively, electrical control means for controlling the actuation of each of said mechanisms in sequential relation, and means operable under the control of the positions of said gas and burner shut-off valves and said chimney valve for controlling the operation of the means for operating said main and auxiliary cold blast valve members, whereby upon closure in sequence of said gas shut-off valve, said burner shut-off valve and said chimney valve said auxiliary cold blast valve member is first operated to open the passage through the main cold blast valve member and thereafter the main cold blast valve member is moved to open position, said position control means comprising a lever limit switch operable in response to the opening of said auxiliary cold blast valve member to prevent the opening of said main cold blast valve member and a pressure-responsive manometer switch operable in response to a predetermined increase of the pressure in said stove to effect the opening movement of said main cold blast valve member.

11. In a hot blast stove for a blast furnace, said stove being provided with a plurality of valves for controlling the operation of said stove in relation to the blast furnace, electrical means for actuating each of said valves, manually operable means for actuating each of said valves, means for conditioning said valves for actuation either by said electrically operated means or by said manually operable means, alternatively, including provision for engaging the manually operable means with the valve actuating means and for disengaging the manually operable means from the valve actuating means, and means for preventing operation of the valve actuating means by the electrical operating means when the manually operable means is in operative engagement with the valve actuating means.

12. In a hot blast stove for a blast furnace, said stove being provided with a plurality of valves for controlling the operation of said stove in relation to the blast furnace, electrical means for actuating said valves, manually operable means for actuating said valves, means for conditioning said valves for actuation either by said electrically operated means or by said manually operable means, alternatively, and means for rendering inoperative the electrical operating means for all of said valves when the manually operable means of any one of said valves of said stove is in valve actuating condition.

13. In a hot blast stove for a blast furnace, said stove being equipped with a hot blast valve, a cold blast valve, at least one chimney valve, a burner shut-off valve and a gas shut-off valve, electrically controlled mechanisms associated with each of said valves for actuating said valves and placing said stove in a plurality of operating conditions thereof including an "on gas" and an "on blast" condition, manually controlled means associated with said stove for selectively placing the latter in any one of said plurality of operating conditions thereof, interlocked electrical controlled means for operating each of said mechanisms in sequential relation whereby the valves of the stove are automatically operated in predetermined sequence with the operation of the hot blast valve being at one extreme of said sequence and the operation of the gas shut-off valve being at the other extreme of said sequence of operation in direct response to a single operation of said manually controlled means, whereby a single manual operation is operative to automatically change said stove from one operating condition thereof to another.

14. In a hot blast stove for a blast furnace, said stove being equipped with a hot blast valve, a cold blast valve, at least one chimney valve, a burner shut-off valve and a gas shut-off valve, electrically controlled mechanisms associated with each of said valves for actuating said valves and placing said stove in a plurality of operating conditions thereof including an "on gas" and an "on blast" condition, manually controlled means associated with said stove for selectively placing the latter in any one of said plurality of operating conditions thereof, interlocked electrical controlled means for operating each of said mechanisms in sequential relation whereby the valves of the stove are automatically operated in predetermined sequence with the operation of the hot blast valve and of the gas shut-off valve being at opposite terminals, respectively, of the sequence of operations, in direct response to a single operation of said manually controlled means, whereby a single manual operation is operative to automatically change said stove from one operating condition thereof to another, said interlocked electrical controlled means comprising means operable under the control of the position of said hot blast valve for controlling the mechanism associated with said cold blast valve, means operable under the control of the position of said cold blast valve for controlling the mechanism associated with said chimney valve, means operable under the control of the position of said chimney valve for controlling the mechanism associated with said burner shut-off valve, and means operable under the control of the position of said burner shut-off valve for controlling the mechanism associated with said gas shut-off valve.

15. In a hot blast stove for a blast furnace, said stove being equipped with a hot blast valve, a cold blast valve, at least one chimney valve, a burner shut-off valve and a gas shut-off valve, electrically controlled mechanisms associated with each of said valves for actuating said valves and placing said stove in a plurality of operating conditions thereof including an "on gas" and an "on blast" condition, manually controlled means associated with said stove for selectively placing the latter in any one of said plurality of operating conditions thereof, interlocked electrical controlled means for operating each of said mechanisms in sequential relation whereby the valves of the stove are automatically operated in predetermined sequence with the operation of the hot blast valve and of the gas shut-off valve being at opposite terminals, respectively, of the sequence of operations, in direct response to a single operation of said manually controlled means, whereby a single manual operation is operative to automatically change said stove from one operating condition thereof to another, said interlocked electrical controlled means comprising means operable under the control of the position of said hot blast valve for controlling the mechanism associated with said cold blast valve, means operable under the control of the position of said cold blast valve for controlling the mechanism associated with said chimney valve, means operable under the control of the position of said chimney valve for controlling the mechanism associated with said burner shut-off valve, and means operable under the control of the position of said burner shut-off valve for controlling the mechanism associated with said gas shut-off valve, said manually controlled means being operative when moved to one position thereof for changing the stove from the "on blast" condition to the "on gas" condition to automatically cause the hot blast valve to close, whereby upon closure of said hot blast valve said cold blast valve is automatically closed, upon closure of said cold blast valve said chimney valve is automatically opened, upon opening of said chimney valve said burner shut-off valve is automatically opened and upon opening of the burner shut-off valve said gas shut-off valve is automatically opened.

16. In a hot blast stove for a blast furnace, said stove being equipped with a hot blast valve, a cold blast valve, at least one chimney valve, a burner shut-off valve and a gas shut-off valve, electrically controlled mechanisms associated with each of said valves for actuating said valves and placing said stove in a plurality of operating conditions thereof including an "on gas" and an "on blast" condition, manually controlled means associated with said stove for selectively placing the latter in any one of said plurality of operating conditions thereof, interlocked electrical controlled means for operating each of said mechanisms in sequential relation whereby the valves of the stove are automatically operated in predetermined sequence with the operation of the hot blast valve and of the gas shut-off valve being at opposite terminals, respectively, of the sequence of operations, in direct response to a single operation of said manually controlled means, whereby a single manual operation is operative to automatically change said stove from one operating condition thereof to another, said interlocked electrical controlled means comprising means operable under the control of the position of said gas shut-off valve for controlling the mechanism associated with said burner shut-off valve, means operable under the control of the position of said burner shut-off valve for controlling the mechanism associated with said chimney valve, means operable under the control of the position of said chimney valve for controlling the mechanism associated with said cold blast valve, and means operable under the control of the position of said cold blast valve for controlling the mechanism associated with said hot blast valve.

17. In a hot blast stove for a blast furnace, said stove being equipped with a hot blast valve, a cold blast valve, at least one chimney valve, a burner shut-off valve and a gas shut-off valve, electrically controlled mechanisms associated with each of said valves for actuating said valves and placing said stove in a plurality of operating conditions thereof including an "on gas" and an "on blast" condition, manually controlled means associated with said stove for selectively placing the latter in any one of said plurality of operating conditions thereof, interlocked electrical controlled means for operating each of said mechanisms in sequential relation whereby the valves of the stove are automatically operated in predetermined sequence with the operation of the hot blast valve and of the gas shut-off valve being at opposite terminals, respectively, of the sequence of operations, in direct response to a single operation of said manually controlled means, whereby a single manual operation is operative to automatically change said stove from one operating condition thereof to another, said interlocked electrical controlled means comprising means operable under the control of the position of said gas shut-off valve for controlling the mechanism associated with said burner shut-off valve, means operable under the control of the position of said burner shut-off valve for controlling the mechanism associated with said chimney valve, means operable under the control of the position of said chimney valve for controlling the mechanism associated with said cold blast valve, and means operable under the control of the position of said cold blast valve for controlling the mechanism associated with said hot blast valve, said manually controlled means being operative when moved to one position thereof for changing the stove from the "on gas" to the "on blast" condition to automatically cause the gas shut-off valve to close, whereby upon closure of said gas shut-off valve said burner shut-off valve is automatically closed, upon closure of said burner shut-off valve said chimney valve is automatically closed, upon closing of said chimney valve said cold blast valve is automatically opened and upon opening of the cold blast valve said hot blast valve is automatically opened.

18. In a blast furnace installation where air is heated by regenerative heating in a plurality of hot blast stoves for supplying heated air to the blast furnace, each of said stoves being equipped with a hot blast valve, a cold blast valve, at least one chimney valve, a burner shut-off valve and a gas shut-off valve, electrically controlled mechanisms associated with each of said valves for actuating said valves and placing each of said stoves in a plurality of operating conditions thereof including an "on gas" and an "on blast" condition, manually controlled means associated with each stove for selectively initiating the placing of the latter in any one of said plurality of operating conditions thereof, interlocked electrical controlled means for operating each of said mechanisms in sequential relation whereby the valves of each stove are automatically operated in predetermined sequence with the operation of the hot blast valve being at one extreme of said sequence and the operation of the gas shut-off valve being at the other extreme of said sequence of operations, in direct response to a single actuation of said manually controlled means, whereby a single manual operation is operative to automatically change any one of said blast stoves from one operating condition thereof to another.

19. In a blast furnace installation where air is heated by regenerative heating in a plurality of hot blast stoves for supplying heated air to the blast furnace, each of said stoves being equipped with a hot blast valve, a cold blast valve, at least one chimney valve, a burner shut-off valve and a gas shut-off valve, electrically controlled mechanisms associated with each of said valves for actuating said valves and placing each of said stoves in a plurality of operating conditions thereof including an "on gas," an "on blast," and an "on bottled" condition, manually controlled means associated with each stove for selectively initiating the placing of the latter in any one of said plurality of operating conditions thereof, interlocked electrical controlled means for operating each of said mechanisms in sequential relation whereby the valves of each stove are automatically operated in predetermined sequence with the operation of the hot blast valve being at one extreme of said sequence and the operation of the gas shut-off valve being at the other extreme of said sequence of operations, in direct response to a single actuation of said manually controlled means, whereby a single manual operation is operative to automatically change any one of said blast stoves from one operating condition thereof to another, said manually controlled means comprising a switch having four positions for selectively placing the associated stove in the "on blast," "on gas," "on bottled" from "on gas," and "on bottled" from "on blast" conditions, respectively.

20. In a blast furnace installation where air is heated by regenerative heating in a plurality of hot blast stoves for supplying heated air to the blast furnace, each of said stoves being equipped with a hot blast valve, a cold blast valve, at least one chimney valve, a burner shut-off valve and a gas shut-off valve, electrically controlled mechanisms associated with each of said valves for actuating said valves and placing each of said stoves in a plurality of operating conditions thereof including an "on gas," an "on blast," and an "on bottled" condition, manually controlled means associated with each stove for selectively initiating the placing of the latter in any one of said plurality of operating conditions thereof, interlocked electrical controlled means for operating each of said mechanisms in sequential relation whereby the valves of each stove are automatically operated in predetermined sequence with the operation of the hot blast valve being at one extreme of said sequence and the operation of the gas shut-off valve being at the other extreme of said sequence of operations, in direct response to a single actuation of said manually controlled means, whereby a single manual operation is operative to automatically change any one of said blast stoves from one operating condition thereof to another, and additional interlocked electrical controlled means for preventing any of the stoves from being placed in the "on gas" condition unless at least one of the other stoves has its hot blast valve fully opened.

21. In a blast furnace installation where air is heated by regenerative heating in a plurality of hot blast stoves for supplying heated air to the blast furnace, each of said stoves being equipped with a hot blast valve, a cold blast valve, at least one chimney valve, a burner shut-off valve and a gas shut-off valve, electrically controlled mechanisms associated with each of said valves for actuating said valves and placing each of said stoves in a plurality of operating conditions thereof including an "on gas," an "on blast," and an "on bottled" condition, manually controlled means associated with each stove for selectively initiating the placing of the latter in any one of said plurality of operating conditions thereof, interlocked electrical controlled means for operating each of said mechanisms in sequential relation whereby the valves of each stove are automatically operated in predetermined sequence with the operation of the hot blast valve being at one extreme of said sequence and the operation of the gas shut-off valve being at the other extreme of said sequence of operations, in direct response to a single actuation of said manually controlled means, whereby a single manual operation is operative to automatically change any one of said blast stoves from one operating condition thereof to another, said manually controlled means comprising a switch having four positions for selectively placing the associated stove in the "on blast," "on gas," "on bottled" from "on gas," and "on bottled" from "on blast" conditions, respectively, and additional interlocked electrical controlled means for preventing any of the stoves from being placed in the "on gas" condition unless at least one of the other stoves has its hot blast valve fully opened.

References Cited in the file of this patent

UNITED STATES PATENTS

| | | |
|---|---|---|
| 1,648,052 | Kennedy | Nov. 8, 1927 |
| 1,713,313 | Willcox | May 14, 1929 |
| 2,368,937 | McGillin et al. | Feb. 6, 1945 |
| 2,601,979 | Rice et al. | July 1, 1952 |